(12) United States Patent
    Muto

(10) Patent No.: US 12,614,517 B2
(45) Date of Patent: Apr. 28, 2026

(54) LIGHT EMITTING DEVICE, PHOTOELECTRIC CONVERSION DEVICE, AND ELECTRONIC APPARATUS

(71) Applicant: CANON KABUSHIKI KAISHA, Tokyo (JP)

(72) Inventor: Takashi Muto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/931,571

(22) Filed: Oct. 30, 2024

(65) Prior Publication Data

US 2025/0148984 A1 May 8, 2025

(30) Foreign Application Priority Data

Nov. 7, 2023 (JP) ................................. 2023-190196
Aug. 7, 2024 (JP) ................................. 2024-131208

(51) Int. Cl.
    *G09G 3/3233* (2016.01)
    *H04N 23/63* (2023.01)

(52) U.S. Cl.
    CPC .......... *G09G 3/3233* (2013.01); *H04N 23/63* (2023.01); *G09G 2300/0842* (2013.01); *G09G 2300/0861* (2013.01); *G09G 2310/08* (2013.01); *G09G 2320/0252* (2013.01)

(58) Field of Classification Search
    CPC ............... G09G 3/3233; G09G 3/3266; G09G 2300/0426; G09G 2300/0842; G09G 2300/0861; G09G 2310/0267; G09G 2310/08; G09G 2320/0252; G09G 2370/02; H04N 23/63; H04N 5/66; H05B 33/12; H10K 59/10
    See application file for complete search history.

(56) References Cited

U.S. PATENT DOCUMENTS

| | | | |
|---|---|---|---|
| 11,062,641 B2 | 7/2021 | Yamasaki | |
| 11,521,540 B2 | 12/2022 | Muto | |
| 11,798,483 B1 * | 10/2023 | Ha ....................... | G09G 3/3258 |
| 12,154,492 B2 | 11/2024 | Muto | |
| 2007/0200812 A1 | 8/2007 | Maede et al. | |
| 2012/0001948 A1 | 1/2012 | Toyomura et al. | |
| 2015/0144945 A1 * | 5/2015 | Kusunoki ............. | G02F 1/1368 257/43 |
| 2020/0279874 A1 * | 9/2020 | Kawashima ........... | H10D 99/00 |
| 2022/0108658 A1 | 4/2022 | Muto | |

FOREIGN PATENT DOCUMENTS

| | | |
|---|---|---|
| JP | 2010-145579 A | 7/2010 |
| JP | 2012-013973 A | 1/2012 |
| JP | 2016-031431 A | 3/2016 |

* cited by examiner

*Primary Examiner* — Nelson M Rosario

(74) *Attorney, Agent, or Firm* — Venable LLP

(57) ABSTRACT

A light emitting device includes a first pixel circuit and a second pixel circuit, a signal line configured to supply a pixel signal to the first pixel circuit and the second pixel circuit, and a first transistor connected to the signal line. Each of the first pixel circuit and the second pixel circuit includes a light emitting element, a second transistor arranged on a path where a current for causing the light emitting element to emit light flows, and a third transistor connected to a control terminal of the second transistor. The third transistor of each of the first pixel circuit and the second pixel circuit is connected to the signal line via the first transistor.

11 Claims, 15 Drawing Sheets

F I G. 1
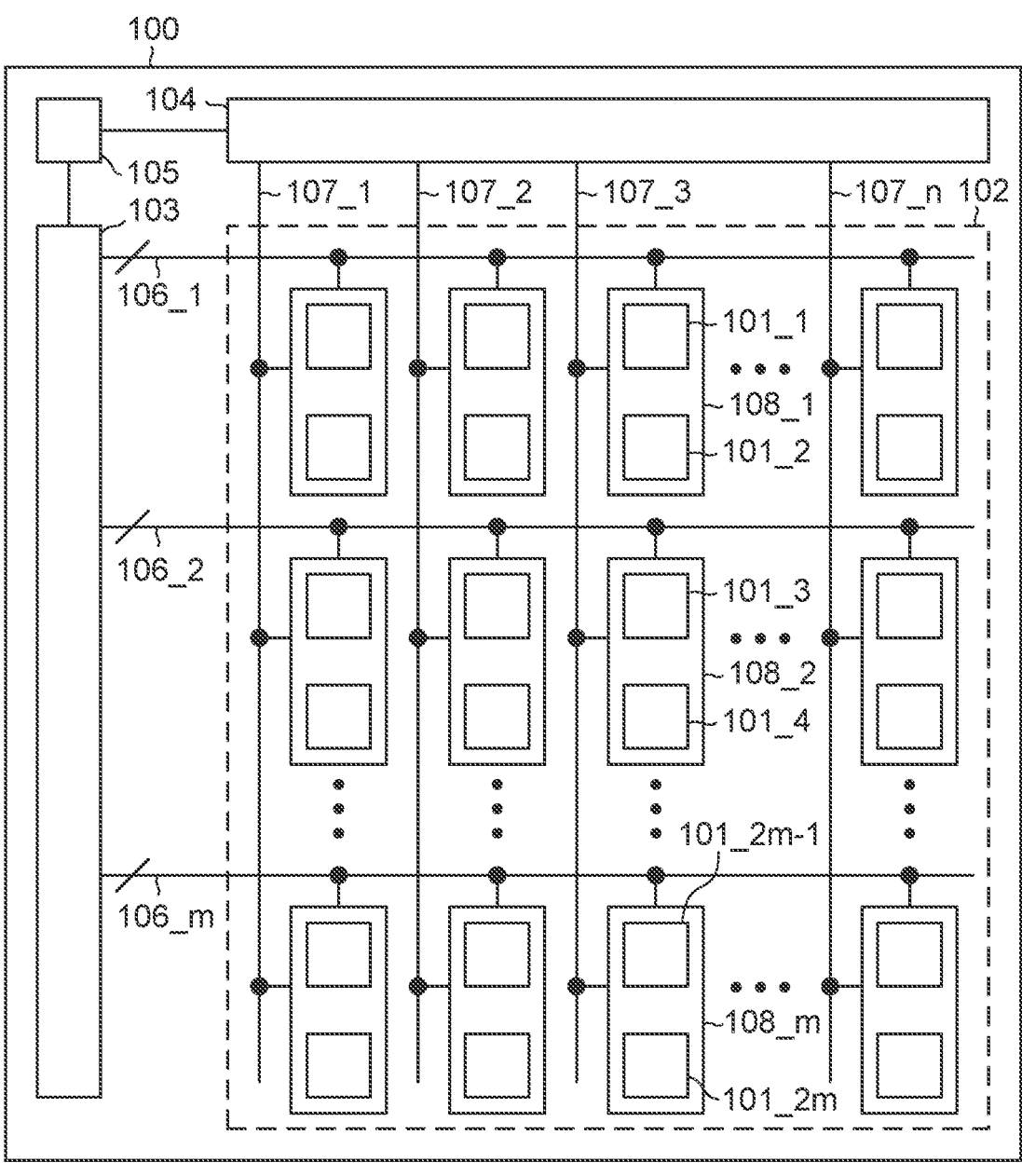

F I G. 3
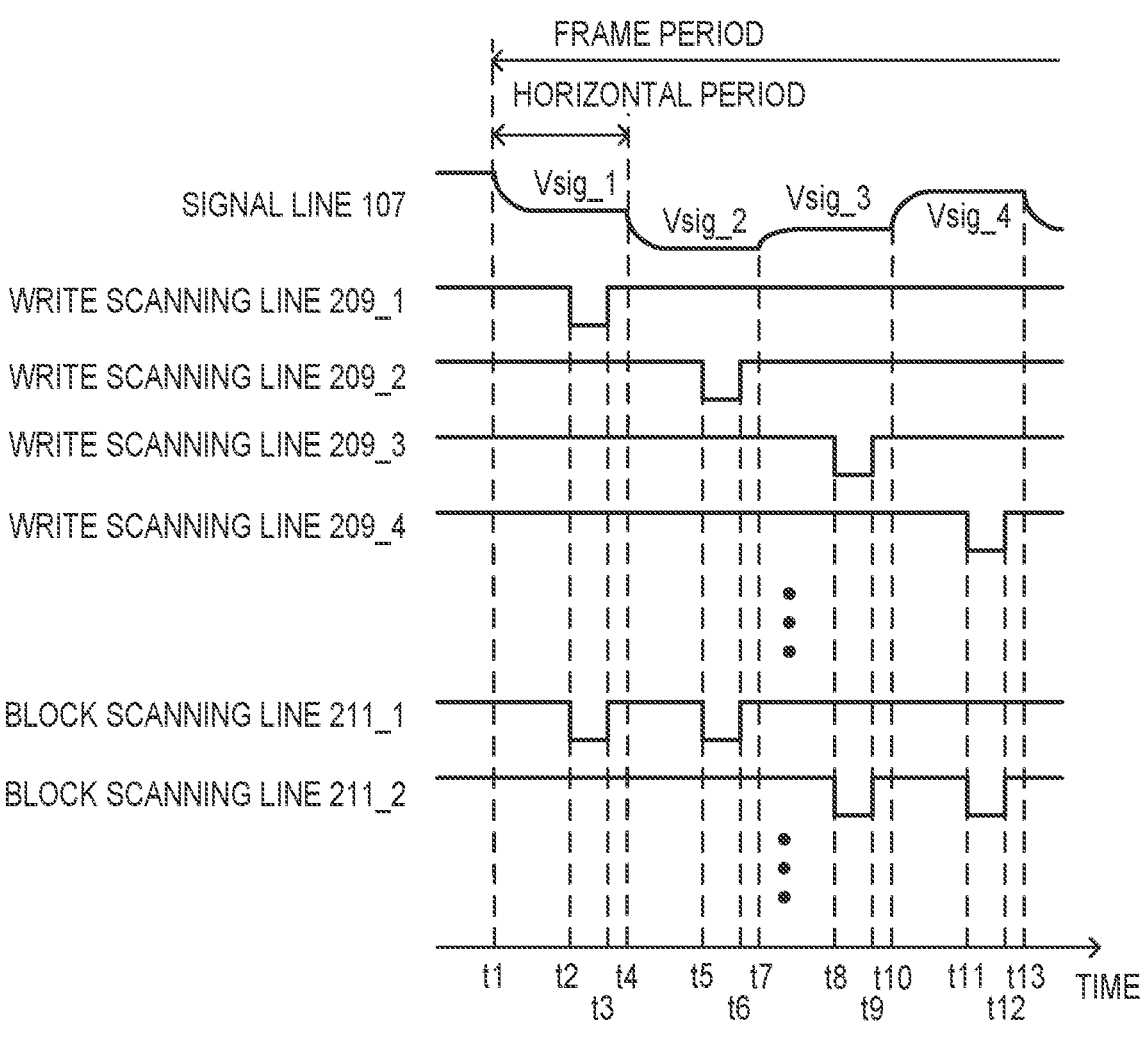

F I G. 4
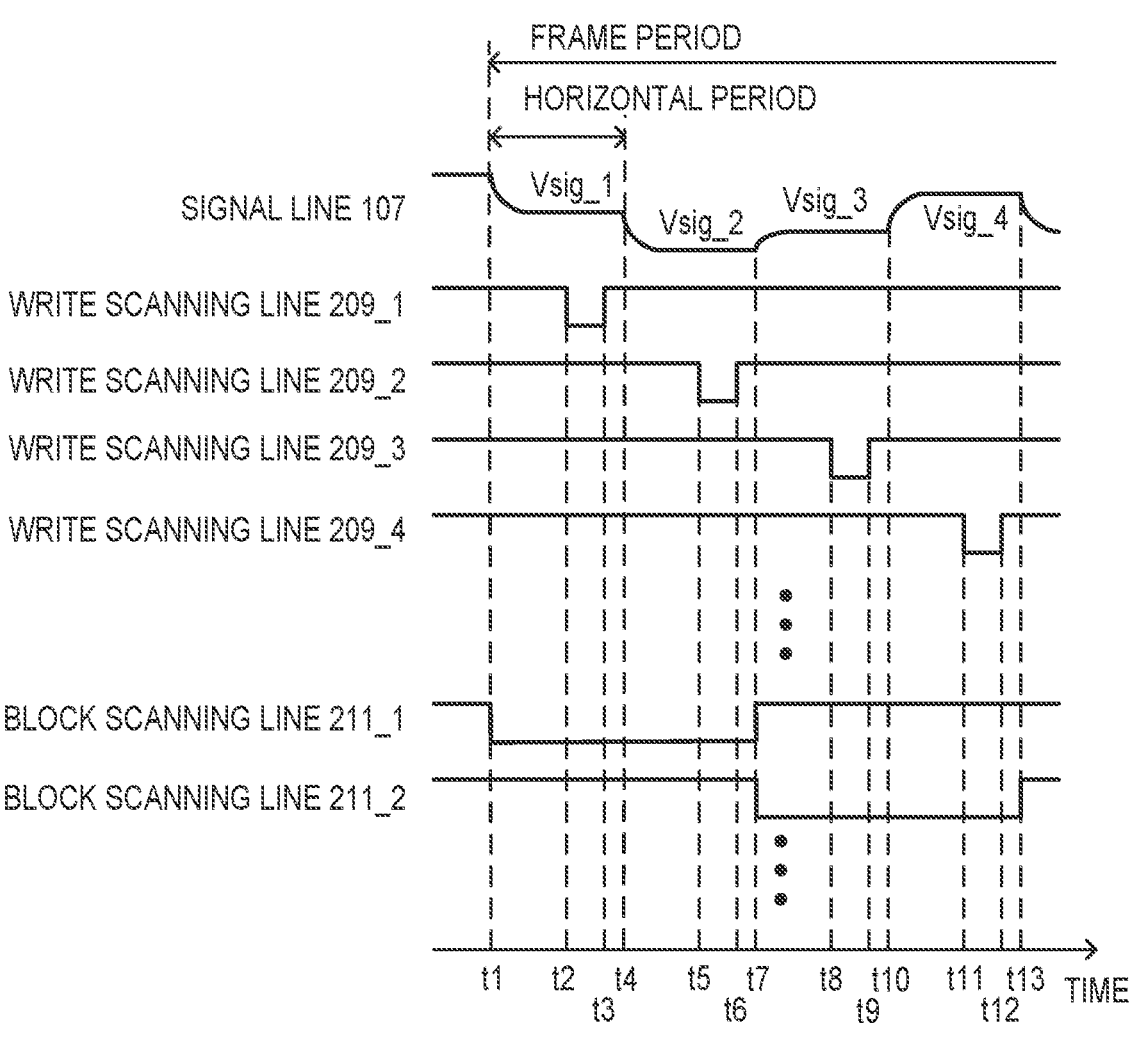

F I G. 5
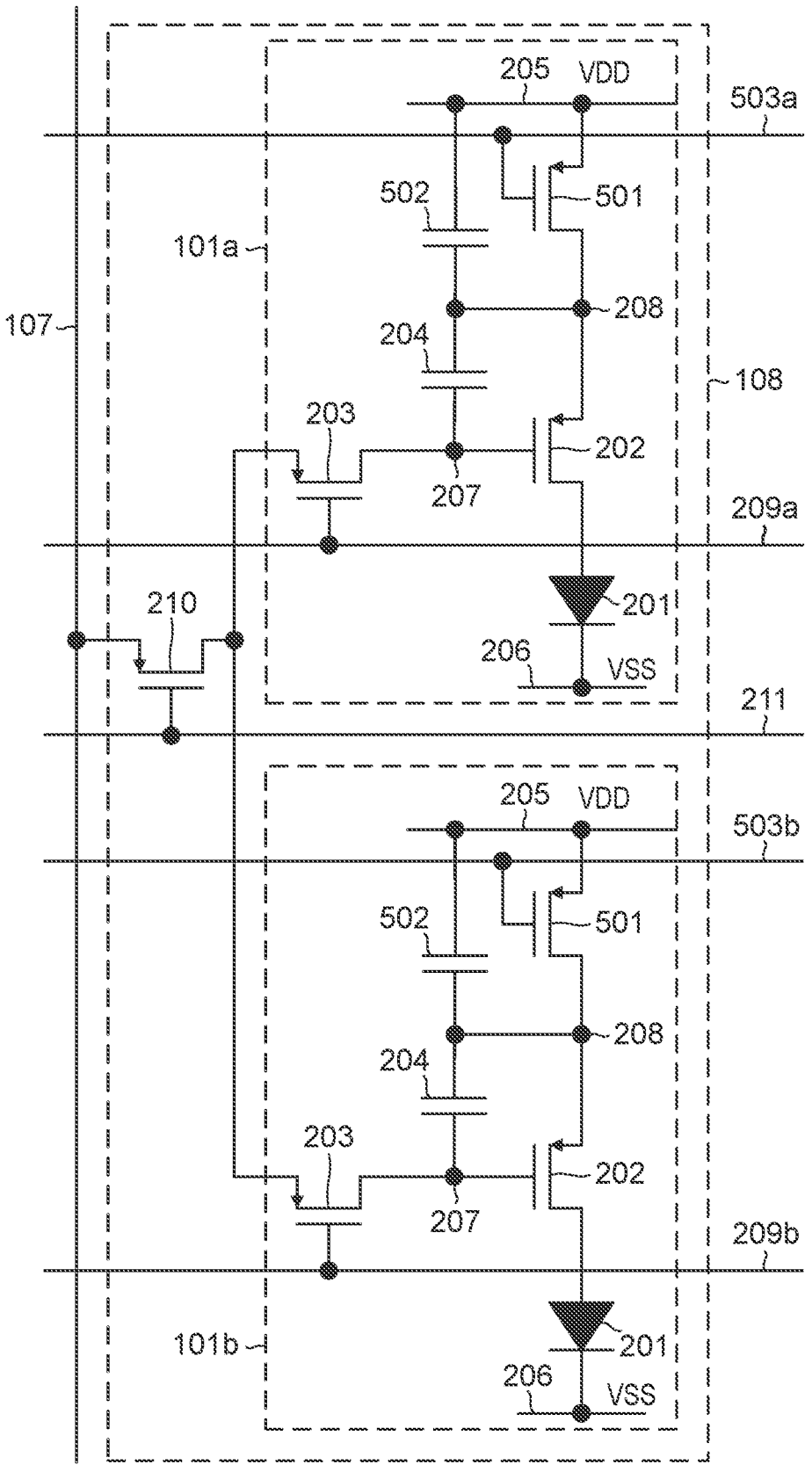

F I G.  10
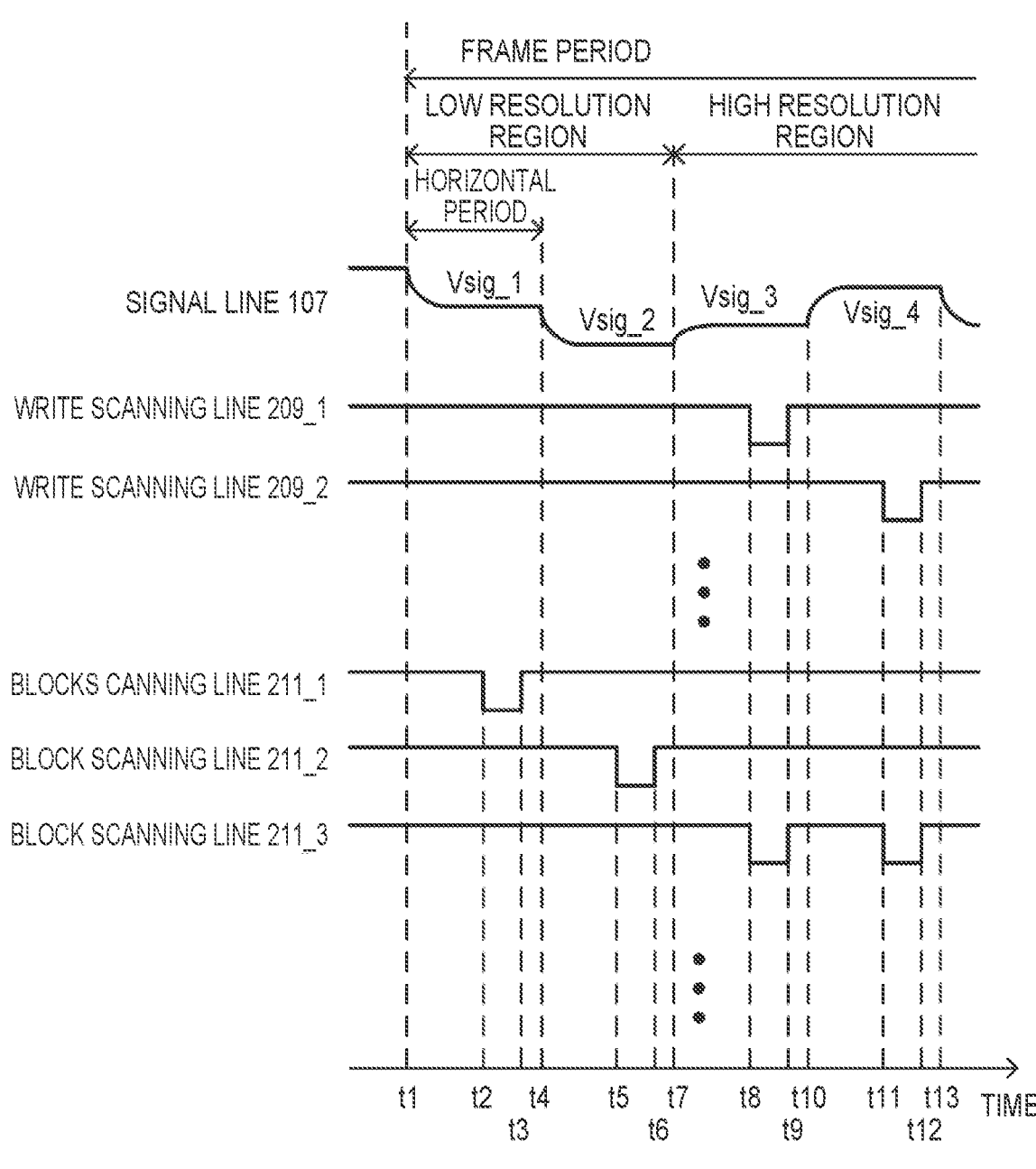

F I G. 12A
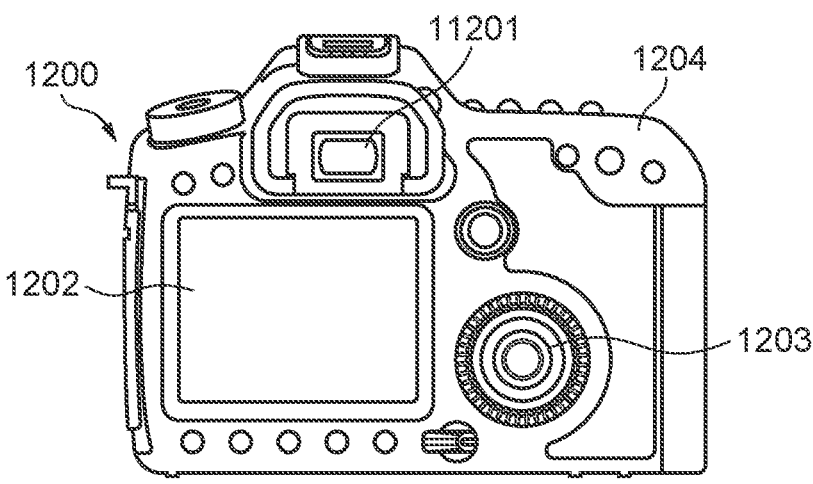
F I G. 12B
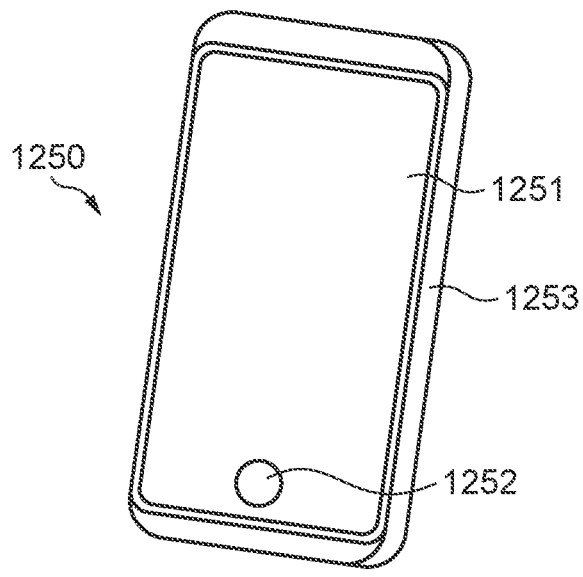

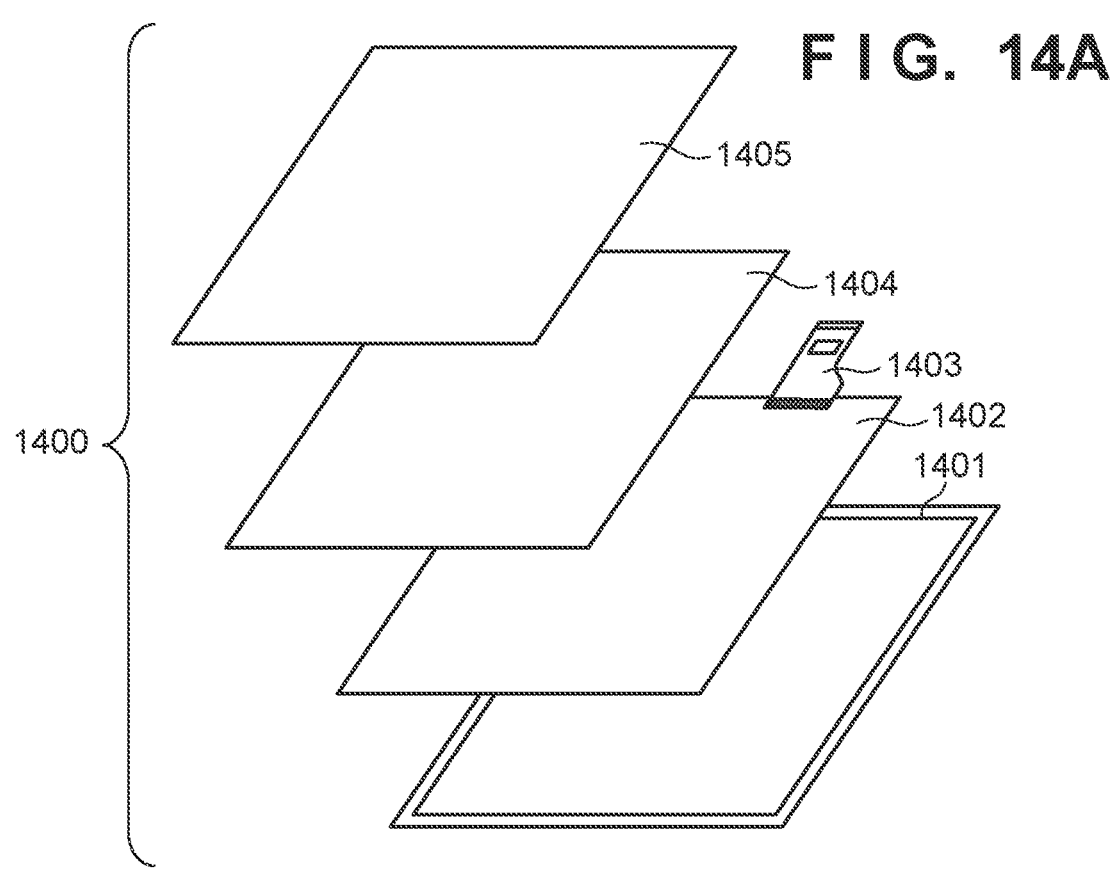
F I G. 14A
1405
1404
1403
1402
1401
1400
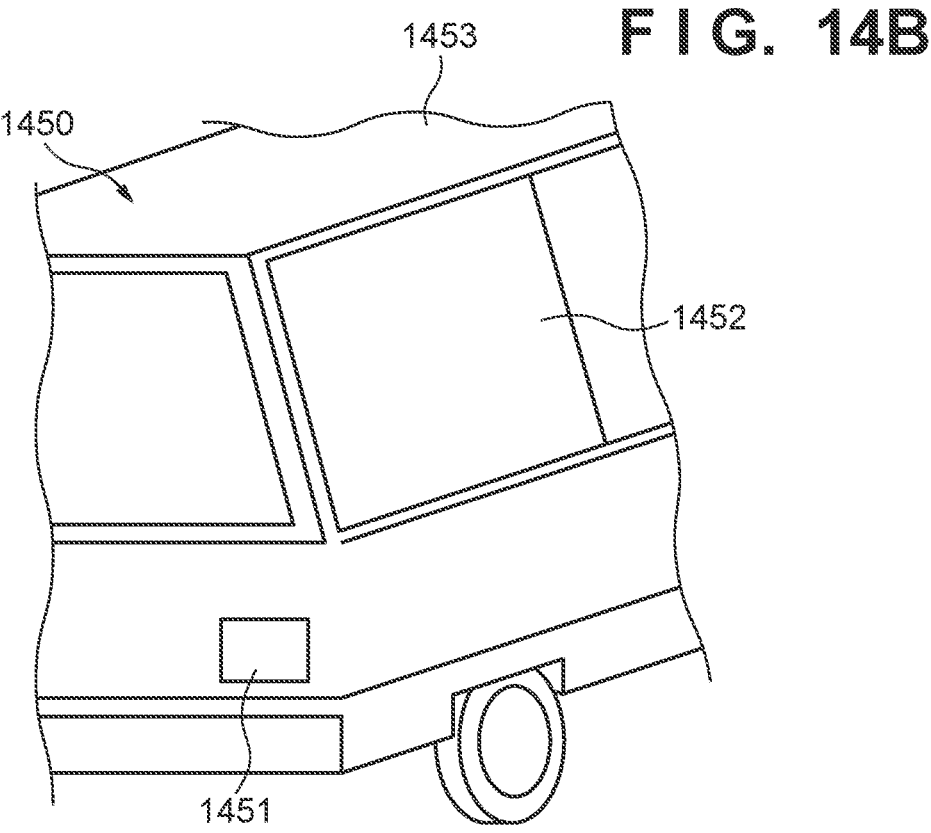
F I G. 14B
1453
1450
1452
1451

F I G. 15A
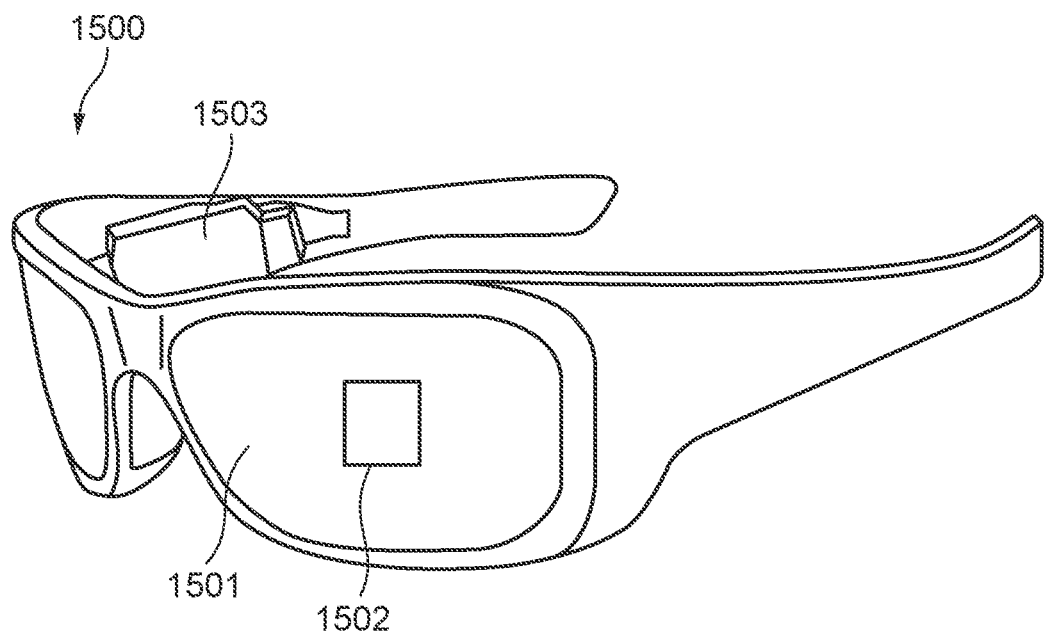
F I G. 15B
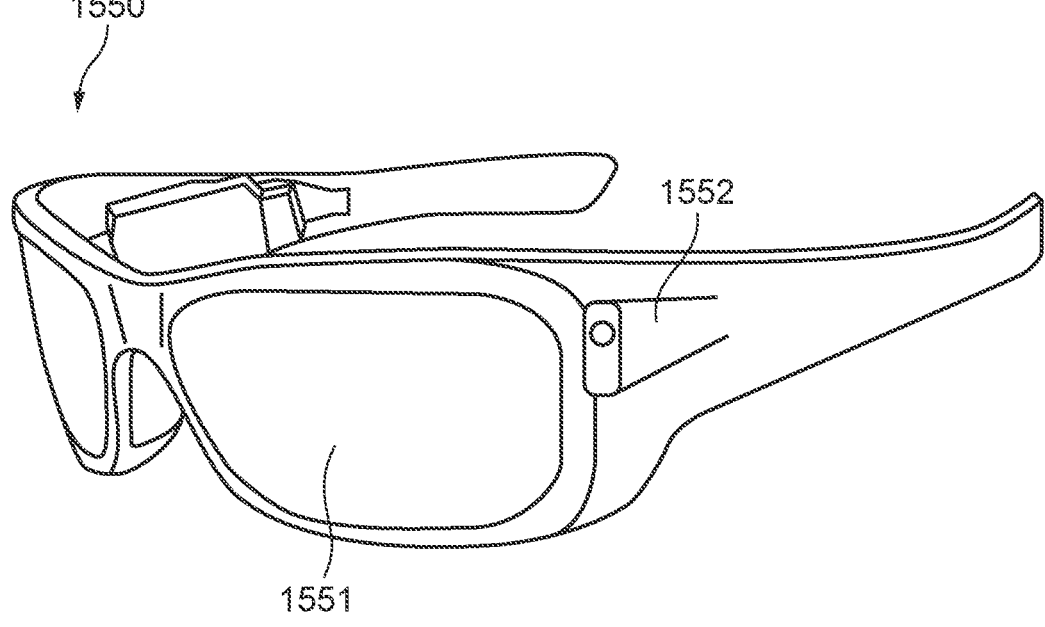

LIGHT EMITTING DEVICE, PHOTOELECTRIC CONVERSION DEVICE, AND ELECTRONIC APPARATUS

BACKGROUND OF THE INVENTION

Field of the Invention

The present invention relates to a light emitting device, a photoelectric conversion device, and an electronic apparatus.

Description of the Related Art

An active matrix display device in which a driving transistor for controlling a current flowing to a light emitting element is arranged in a pixel circuit is under development. In a display device described in Japanese Patent Laid-Open No. 2010-145579, each of a plurality of pixel circuits forming a pixel column is connected to one signal line. As the number of transistors connected to the signal line increases, the load capacitance of the signal line also increases. If the load capacitance of the signal line is large, the potential settlement time of the signal line increases, and it becomes difficult to accurately write a signal in the pixel circuit at high speed.

SUMMARY OF THE INVENTION

Some aspects of the present disclosure decrease the load capacitance of a signal line. According to some embodiments, a light emitting device comprising: a first pixel circuit and a second pixel circuit; a signal line configured to supply a pixel signal to the first pixel circuit and the second pixel circuit; and a first transistor connected to the signal line, wherein each of the first pixel circuit and the second pixel circuit includes a light emitting element, a second transistor arranged on a path where a current for causing the light emitting element to emit light flows, and a third transistor connected to a control terminal of the second transistor, and the third transistor of each of the first pixel circuit and the second pixel circuit is connected to the signal line via the first transistor is provided.

Further features of the present invention will become apparent from the following description of exemplary embodiments with reference to the attached drawings.

BRIEF DESCRIPTION OF THE DRAWINGS

FIG. 1 is a block diagram for explaining an example of the arrangement of a light emitting device according to the first embodiment;

FIG. 3 is a timing chart for explaining an example of the operation of the light emitting device according to the first embodiment;

FIG. 4 is a timing chart for explaining another example of the operation of the light emitting device according to the first embodiment;

FIG. 5 is a circuit diagram for explaining an example of the arrangement of a pixel circuit according to the second embodiment;

FIG. 7 is a block diagram for explaining an example of the arrangement of a light emitting device according to the third embodiment;

FIG. 9 is a circuit diagram for explaining an example of the arrangement of a pixel circuit according to the fourth embodiment;

FIG. 10 is a timing chart for explaining an example of the operation of the light emitting device according to the fourth embodiment;

FIG. 12A is a view showing an example of a photoelectric conversion device using the light emitting device according to the embodiment;

FIG. 12B is a view showing an example of an electronic apparatus using the light emitting device according to the embodiment;

FIG. 14A is a view showing an example of an illumination device using the light emitting device according to the embodiment;

FIG. 14B is a view showing an example of a moving body using the light emitting device according to the embodiment; and FIGS. 15A and 15B are views each showing an example of a wearable device using the light emitting device according to the embodiment.

DESCRIPTION OF THE EMBODIMENTS

Figure 2:
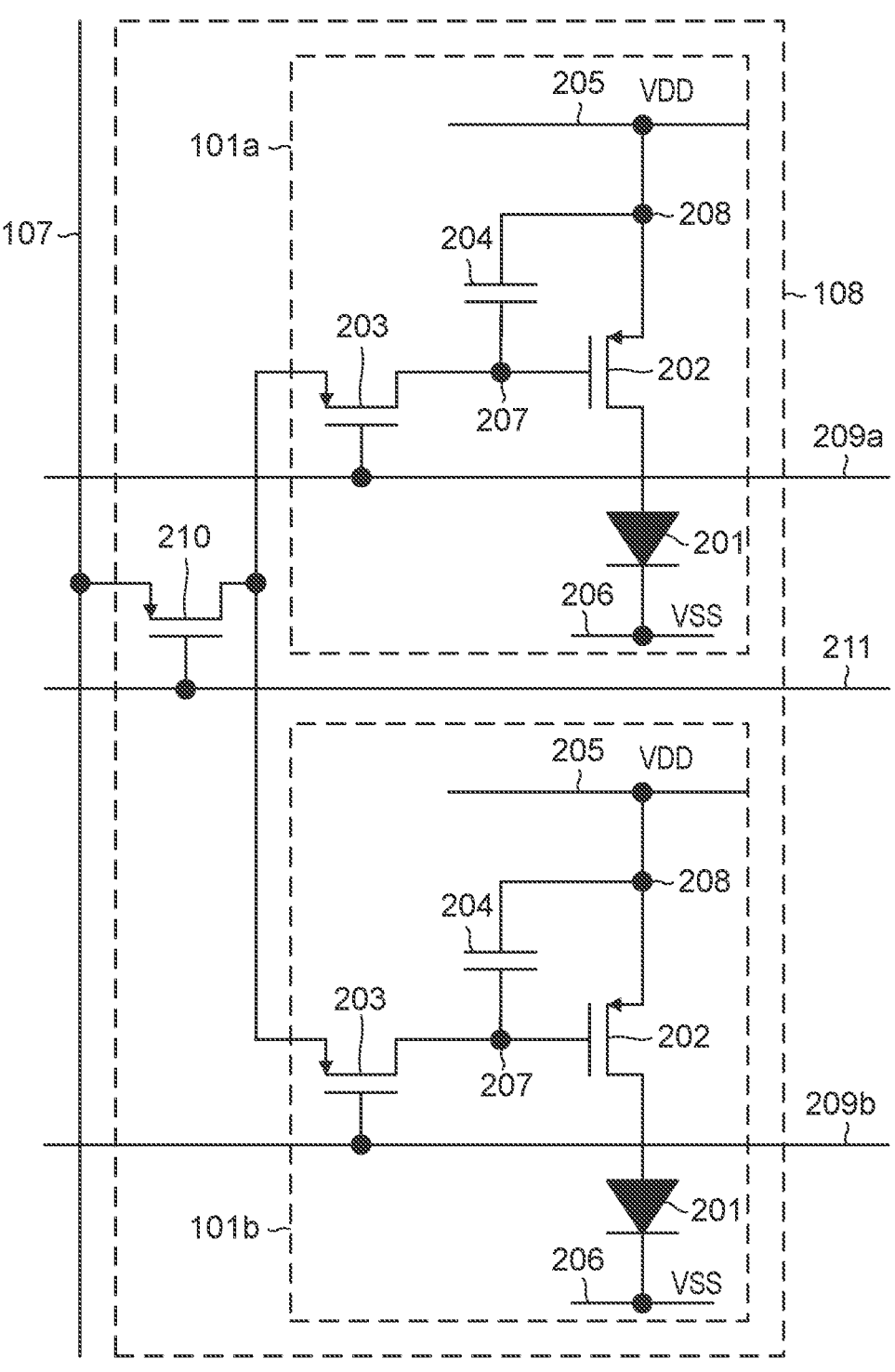
FIG. 2 is a circuit diagram for explaining an example of the arrangement of a pixel circuit according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

With reference to FIG. 1, an example of the arrangement of a light emitting device 100 according to the first embodiment will be described. As will be described later, the light emitting device 100 may be used in a display device. For example, the light emitting device 100 may be used in a flat type (or flat panel type) display device.

The light emitting device 100 may include a plurality of pixel circuits 101, a vertical scanning circuit 103, a signal output circuit 104, and a control circuit 105. The plurality of pixel circuits 101 are two-dimensionally arranged (that is, so as to form a plurality of pixel rows and a plurality of pixel columns) in a pixel array portion 102. The pixel row may be a row formed by multiple pixels arranged in a row direction (horizontal direction) in FIG. 1. The pixel column may be a column formed by multiple pixels arranged in a column direction (vertical direction) in FIG. 1. The plurality of pixel circuits 101 may be one-dimensionally arranged. In the example shown in FIG. 1, the plurality of pixel circuits 101 are arranged in 2m rows and n columns (m and n are integers of 1 or more). For one pixel column, the ith pixel circuit 101 from the signal output circuit 104 is referred to as a pixel circuit 101_i (i is an integer from 1 to 2 m). The pixel circuit 101 may simply be referred to as a pixel. In FIG. 1, for descriptive simplicity, a case will be described in which the number of pixel rows included in the pixel array portion 102 is even. Instead, the number of pixel rows included in the pixel array portion 102 may be odd.

Plural ones of the multiple pixel circuits 101 included in each pixel column form a pixel block 108. In FIG. 1, an example will be described in which each pixel block 108 is formed by two adjacent pixel circuits 101 arranged in the column direction (that is, the extending direction of a signal line 107). For one pixel column, the ith pixel block 108 from the signal output circuit 104 is referred to as a pixel block 108_i (i is an integer from 1 to m). Each pixel block 108 may be formed by three or more pixel circuits 101. The pixel circuits 101 included in the same pixel block 108 may or may not be successive. For example, the pixel circuit 101 in the first row and the pixel circuit 101 in the third row may form the pixel block 108, and the pixel circuit 101 in the second row may not be included in this pixel block 108. Further, one pixel block 108 may include pixel circuits 101 included in different pixel columns.

The number of the pixel circuits 101 included in the pixel block 108 may be the same or different throughout the pixel array portion 102. For example, the number of the pixel circuits 101 included in the pixel block 108 may change for each region of the pixel array portion 102. Further, the pixel circuit 101 not forming the pixel block 108 may be included in the pixel array portion 102. For example, the pixel blocks 108 may be arranged only in some regions of the pixel array portion 102.

In the pixel array portion 102, m scanning lines 106_1 to 106_m each extending in the row direction are arranged. In the following description, the plurality of scanning lines 106_1 to 106_m are collectively referred to as scanning lines 106. A description of the scanning line 106 may apply to any of one or more scanning lines 106_1 to 106_m. The scanning line 106 may represent an arbitrary one of one or more scanning lines 106_1 to 106_m, or a specific one which is determined by the context. This also applies to other constituent elements to be collectively referred to below. One scanning line 106 may be divided into multiple scanning lines, as will be described later. Each scanning line 106 connects the vertical scanning circuit 103 and each of the multiple pixel blocks 108 included in the corresponding row. The vertical scanning circuit 103 supplies a scanning signal to each pixel block 108 via the scanning line 106, thereby switching each of a plurality of transistors included in each pixel block 108 between ON (that is, a conductive state) and OFF (that is, a non-conductive state). The operation of the vertical scanning circuit 103 is controlled by the control circuit 105.

In the pixel array portion 102, n signal lines 107_1 to 107_n each extending in the column direction are arranged. In the following description, the plurality of signal lines 107_1 to 107_n are collectively referred to as signal lines 107. Each signal line 107 connects the signal output circuit 104 and each of the multiple pixel blocks 108 included in the corresponding column. The signal output circuit 104 supplies a pixel signal to each pixel circuit 101 included in each pixel block 108 via the signal line 107. The pixel signal can have a signal potential Vsig corresponding to luminance information. The pixel signal may be called an image signal when the light emitting device 100 displays an image, and may be called a video signal when the light emitting device

100 displays a video. The operation of the signal output circuit 104 is controlled by the control circuit 105.

With reference to FIG. 2, an example of the arrangement of the pixel block 108 will be described. The pixel block 108 is formed by two pixel circuits 101a and 101b adjacent to each other in the column direction and a block transistor 210. The pixel circuit 101a and the pixel circuit 101b may have the same arrangement or different arrangements. Each of two pixel circuits 101a and 101b can correspond to the pixel circuit 101 shown in FIG. 1. For example, the pixel circuit 101a may correspond to the pixel circuit 101 included in the odd-numbered pixel row, and the pixel circuit 101b may correspond to the pixel circuit 101 included in the even-numbered pixel row. The following description of the pixel circuit 101 applies to each of two pixel circuits 101a and 101b.

The scanning line 106 arranged for the pixel block 108 is divided into two write scanning lines 209a and 209b and one block scanning line 211. The write scanning line 209a is arranged for each odd-numbered pixel row. The write scanning line 209b is arranged for each even-numbered pixel row. The block scanning line 211 is arranged for each row of the pixel block 108. The vertical scanning circuit 103 may also be divided in correspondence with two write scanning lines 209a and 209b and one block scanning line 211.

The pixel circuit 101 may include a light emitting element 201, a driving transistor 202, a write transistor 203, and a capacitive element 204. The light emitting element 201 may be a current-driven electro-optical element whose light emission luminance changes in accordance with the amount of current flowing through the light emitting element 201. The light emitting element 201 may be, for example, a light emitting diode (LED) or an organic electroluminescence (EL) element. The light emitting element 201 may include an anode and a cathode. The cathode of the light emitting element 201 is connected to a light supply line 206. The power supply line 206 is commonly arranged for the plurality of pixel circuits 101. A power supply potential VSS is supplied to the power supply line 206. In the example shown in FIG. 2, all the transistors included in the pixel circuit 101 are p-channel transistors. Instead, some or all of the transistors included in the pixel circuit 101 may be n-channel transistors.

The driving transistor 202 is a transistor configured to adjust the amount of current flowing through the light emitting element 201. The current flowing through the light emitting element 201 can also be called a driving current. Since the light emitting element 201 emits light when a driving current flows therethrough, the driving current is a current that causes the light emitting element 201 to emit light. The driving transistor 202 is arranged on a path where the driving current flows (in the example shown in FIG. 2, on a path from a power supply line 205 to the power supply line 206 through the driving transistor 202 and the light emitting element 201). In the example shown in FIG. 2, one (for example, drain) of two main terminals of the driving transistor 202 is connected to the anode of the light emitting element 201. The other (for example, source) of two main terminals of the driving transistor 202 is connected to the power supply line 205. The power supply line 205 is commonly arranged for the plurality of pixel circuits 101. A power supply potential VDD is supplied to the power supply line 205. The power supply potential VDD supplied to the power supply line 205 may be higher than the potential VSS supplied to the power supply line 206.

The write transistor 203 is a transistor configured to switch whether to write, in the gate of the driving transistor 202, the pixel signal supplied from the signal output circuit 104 to the pixel circuit 101 via the signal line 107. The gate of the driving transistor 202 functions as the control terminal of the driving transistor 202. This also applies to the gates of other transistors in this specification. The write transistor 203 is arranged on a path connecting the signal line 107 and the gate of the driving transistor 202. The gate of the write transistor 203 of the pixel circuit 101a is connected to the write scanning line 209a. The gate of the write transistor 203 of the pixel circuit 101b is connected to the write scanning line 209b. One (for example, source) of two main terminals of the write transistor 203 is connected to the signal line 107 via the block transistor 210. The other (for example, drain) of two main terminals of the write transistor 203 is connected to the gate of the driving transistor 202.

The capacitive element 204 is a capacitive element configured to hold the gate-source voltage of the driving transistor 202. The capacitive element 204 connects the gate of the driving transistor 202 and the source of the driving transistor 202.

As has been described above, in the circuit arrangement shown in FIG. 2, the gate of the driving transistor 202, one main terminal (for example, drain) of the write transistor 203, and one electrode of the capacitive element 204 are connected to the same node 207. One main terminal (for example, source) of the driving transistor 202, one electrode of the capacitive element 204, and the power supply line 205 are connected to the same node 208.

One (for example, source) of two main terminals of the block transistor 210 is connected to the signal line 107. The other (for example, drain) of two main terminals of the block transistor 210 is connected to one main electrode (for example, source) of the write transistor 203 of the pixel circuit 101a. Further, the other (for example, drain) of two main terminals of the block transistor 210 is also connected to one main electrode (for example, source) of the write transistor 203 of the pixel circuit 101b. The gate of the block transistor 210 is connected to the block scanning line 211.

When the block transistor 210 is ON and the write transistor 203 of the pixel circuit 101a is ON, the pixel signal supplied via the signal line 107 is written in the capacitive element 204 of the pixel circuit 101a. On the other hand, when the block transistor 210 is ON but the write transistor 203 of the pixel circuit 101a is OFF, the pixel signal supplied via the signal line 107 is not written in the capacitive element 204 of the pixel circuit 101a. This also applies to writing of a pixel signal in the capacitive element 204 of the pixel circuit 101b.

In the main terminal (for example, source) of a transistor connected to the signal line 107, a parasitic capacitance for the back gate or the like exists. In the light emitting device 100 described in FIGS. 1 and 2, the number of transistors (more specifically, sources thereof) connected to one signal line 107 is half the number of pixel rows (for example, 2 m) (that is, m which is the number of the block transistors 210). With this, the load capacitance of the signal line 107 decreases as compared to a case where the write transistor 203 (more specifically, source thereof) of each pixel circuit 101 is directly connected to the signal line 107. Accordingly, the potential settlement time of the signal line 107 decreases, and it is possible to accurately write a signal in the pixel circuit 101 at high speed.

The capacitance of the block transistor 210 may be smaller than the capacitance of the write transistor 203 of each of the pixel circuit 101a and the pixel circuit 101b. In this case, the load capacitance of the signal line 107 can be further decreased. The thickness of the gate insulating film of the block transistor 210 may be larger than the thickness of the gate insulating film of the write transistor 203 of each of the pixel circuit 101a and the pixel circuit 101b. The area of the substrate surface occupied by the block transistor 210 may be smaller than the area of the substrate surface occupied by the write transistor 203 of each of the pixel circuit 101a and the pixel circuit 101b. The area of the substrate surface occupied by the transistor may be the total area of two impurity regions respectively functioning as the source and gate of the transistor and the region where a channel is formed in a planar view with respect to the substrate surface.

With reference to FIG. 3, an example of the operation of the light emitting device 100 will be described. This operation can be executed when the control circuit 105 controls the vertical scanning circuit 103 to change the potential of the scanning line 106 and controls the signal output circuit 104 to change the potential of the signal line 107. The timing chart of FIG. 3 shows changes of potentials of the signal line 107, write scanning lines 209_1 to 209_4, and block scanning lines 211_1 and 211_2. The write scanning line 209_i (i is an integer of 1 or more) is arranged for the ith pixel row from the signal output circuit 104. The block scanning line 211_i (i is an integer of 1 or more) is arranged for the row of the ith pixel block 108_i from the signal output circuit 104. The write transistor 203 of the pixel circuit 101_2i−1 included in the (2i−1)th pixel row and the write transistor 203 of the pixel circuit 101_2i included in the (2i)th pixel row are connected to the block transistor 210 included in the pixel block 108_i. For example, the write transistor 203 of a pixel circuit 101_1 included in the first pixel row and the write transistor 203 of a pixel circuit 101_2 included in the second pixel row are connected to the block transistor 210 included in a pixel block 108_1. In the following description, the operation for a specific pixel column included in the pixel array portion 102 will be described. A similar operation is performed for other pixel columns included in the pixel array portion 102.

Since all the transistors included in the pixel block 108 shown in FIG. 2 are p-type transistors, each of these transistors is turned on when a low-level signal is supplied to the gate, and turned off when a high-level signal is supplied to the gate. Some or all of the transistors included in the pixel block 108 shown in FIG. 2 may be n-type transistors.

In the example shown in FIG. 3, one frame period ends at time t1, and the next frame period starts from time t1. The frame period may be a period during which the control circuit 105 controls the light emission state of the light emitting element 201 of each of all the pixel circuits 101 included in the pixel array portion 102 to represent one frame. One frame period includes a plurality of horizontal periods. The horizontal period may be a period during which the control circuit 105 controls the light emission state of the light emitting element 201 of each of all the pixel circuits 101 included in one pixel row to represent one row of one frame. The time from the start (for example, t1) of the frame period to switching of the potential may be a value set in advance.

At the time immediately before time t1, a high-level signal is supplied to each of the write scanning lines 209 and the block scanning lines 211. Therefore, the write transistor 203 included in each pixel circuit 101 and the block transistor 210 included in each pixel block 108 are OFF.

At time t1, the signal output circuit 104 switches the value of the pixel signal supplied to the signal line 107 to a signal potential Vsig_1. The signal potential Vsig_1 has a value corresponding to the luminance of light to be emitted by the light emitting element 201 of the pixel circuit 101_1. The potential of the signal line 107 is settled at the signal potential Vsig_1 in accordance with a time constant corresponding to the load of the signal line 107.

At time t2, the vertical scanning circuit 103 switches the potential of the write scanning line 209_1 and the potential of the block scanning line 211_1 from high level to low level. As a result, the write transistor 203 of the pixel circuit 101_1 and the block transistor 210 included in the pixel block 108_1 are turned on. With this, the signal potential Vsig_1 is written in the capacitive element 204 of the pixel circuit 101_1, and the light emitting element 201 of the pixel circuit 101_1 emits light with the luminance corresponding to the signal potential Vsig_1. Since the write transistor 203 of the pixel circuit 101_2 is OFF, the signal potential Vsig_1 is not written in the capacitive element 204 of the pixel circuit 101_2.

At time t3, the vertical scanning circuit 103 switches the potential of the write scanning line 209_1 and the potential of the block scanning line 211_1 from low level to high level. As a result, the write transistor 203 of the pixel circuit 101_1 and the block transistor 210 included in the pixel block 108_1 are turned off. After this, the capacitive element 204 of the pixel circuit 101_1 continues to hold the signal potential Vsig_1.

At time t4, the signal output circuit 104 switches the value of the pixel signal supplied to the signal line 107 to a signal potential Vsig_2. The signal potential Vsig_2 has a value corresponding to the luminance of light to be emitted by the light emitting element 201 of the pixel circuit 101_2. The potential of the signal line 107 is settled at the signal potential Vsig_2 in accordance with a time constant corresponding to the load of the signal line 107.

At time t5, the vertical scanning circuit 103 switches the potential of the write scanning line 209_2 and the potential of the block scanning line 211_1 from high level to low level. As a result, the write transistor 203 of the pixel circuit 101_2 and the block transistor 210 included in the pixel block 108_1 are turned on. With this, the signal potential Vsig_2 is written in the capacitive element 204 of the pixel circuit 101_2, and the light emitting element 201 of the pixel circuit 101_2 emits light with the luminance corresponding to the signal potential Vsig_2. Since the write transistor 203 of the pixel circuit 101_1 is OFF, the signal potential Vsig_2 is not written in the capacitive element 204 of the pixel circuit 101_1.

At time t6, the vertical scanning circuit 103 switches the potential of the write scanning line 209_2 and the potential of the block scanning line 211_1 from low level to high level. As a result, the write transistor 203 of the pixel circuit 101_2 and the block transistor 210 included in the pixel block 108_1 are turned off. After this, the capacitive element 204 of the pixel circuit 101_2 continues to hold the signal potential Vsig_2.

When the control circuit 105 performs operations, which are similar to those performed from time t1 to time t4, for the block scanning line 211_2 from time t7 to time t10, a signal potential Vsig_3 is written in the capacitive element 204 of a pixel circuit 101_3. When the control circuit 105 performs operations, which are similar to those performed from time t4 to time t7, for the block scanning line 211_2 from time t11 to time t13, a signal potential Vsig_4 is written in the capacitive element 204 of a pixel circuit 101_4. Similarly, signal potentials are written in the capacitive elements 204 of the pixel circuits 101 in the fifth pixel row to the last pixel row. When the processing ends for the last pixel row, one frame period ends.

In the operation shown in FIG. 3, the pixel rows included in the pixel array portion 102 are scanned for each row. Instead, the pixel rows included in the pixel array portion 102 may be scanned for multiple rows. Further, like interlace driving, scanning may be performed for a combination of pixel rows which changes for each frame.

In the operation shown in FIG. 3, the write transistor 203 and the block transistor 210 are simultaneously turned on, and simultaneously turned off. The operation by the vertical scanning circuit 103 is not limited to this. For example, the vertical scanning circuit 103 can write a pixel signal in the gate of the driving transistor 202 of the pixel circuit 101*a* by overlapping a period during which the block transistor 210 is ON and a period during which the write transistor 203 of the pixel circuit 101*a* is ON. As has been described above, during the period when both the block transistor 210 and the write transistor 203 of the pixel circuit 101*a* are ON, the vertical scanning circuit 103 keeps the write transistor 203 of the pixel circuit 101*b* to be OFF. With this, it can be suppressed that the pixel signal to be written in the pixel circuit 101*a* is written in the pixel circuit 101*b*. Writing of a pixel signal in the gate of the driving transistor 202 of the pixel circuit 101*b* may be similar to writing of a pixel signal in the gate of the driving transistor 202 of the pixel circuit 101*a* described above.

From the state in which both the block transistor 210 and the write transistor 203 of the pixel circuit 101*a* are ON, the vertical scanning circuit 103 may turn off the block transistor 210 after turning off the write transistor 203 of the pixel circuit 101*a*. In other words, from the state in which both the block transistor 210 and the write transistor 203 of the pixel circuit 101*a* are turned on, the vertical scanning circuit 103 may turn off the write transistor 203 of the pixel circuit 101*a* while keeping the block transistor 210 ON. With this, it can be suppressed that the signal accuracy deteriorates due to the influence of field-through upon turning off the write transistor 203 and field-through upon turning off the block transistor 210. The timing of turning off the write transistor 203 of the pixel circuit 101*b* may be similar to the timing of turning off the write transistor 203 of the pixel circuit 101*a* described above.

With reference to FIG. 4, another example of the operation of the light emitting device 100 will be described. The operation shown in FIG. 4 is different from the operation shown in FIG. 3 in the timing of switching the signals supplied to the block scanning lines 211_1 and 211_2. The rest may be the same as in the operation shown in FIG. 3.

The vertical scanning circuit 103 switches the potential of the block scanning line 211_1 from high level to low level at time t1, and switches it from low level to high level at time t7. With this, the block transistor 210 included in the pixel block 108_1 is turned on from time t1 to time t7. Accordingly, when the vertical scanning circuit 103 switches the potential of the write scanning line 209_1 from high level to low level at time t2, the signal potential Vsig_1 is written in the capacitive element 204 of the pixel circuit 101_1. Then, when the vertical scanning circuit 103 switches the potential of the write scanning line 209_2 from high level to low level at time t5, the signal potential Vsig_2 is written in the capacitive element 204 of the pixel circuit 101_2.

When the control circuit 105 performs operations, which are similar to those performed from time t1 to time t4, for the block scanning line 211_2 from time t7 to time t10, the signal potential Vsig_3 is written in the capacitive element 204 of the pixel circuit 101_3. When the control circuit 105 performs operations, which are similar to those performed from time t4 to time t7, for the block scanning line 211_2 from time t11 to time t13, the signal potential Vsig_4 is written in the capacitive element 204 of the pixel circuit 101_4. Similarly, signal potentials are written in the capacitive elements 204 of the pixel circuits 101 in the fifth pixel row to the last pixel row. When the processing ends up to the last pixel row, one frame period ends.

Second Embodiment

With reference to FIG. 5, an example of the arrangement of a light emitting device 100 according to the second embodiment will be described. The light emitting device 100 according to the second embodiment is different from the light emitting device 100 according to the first embodiment in that a pixel circuit 101 further includes a light emission control transistor 501 and a capacitive element 502, and a scanning line 106 further includes light emission scanning lines 503a and 503b. The rest may be the same as in the first embodiment.

The light emission control transistor 501 is a transistor configured to switch whether to cause a light emitting element 201 to emit light. In the example shown in FIG. 5, the light emission control transistor 501 is a p-type transistor. Instead, the light emission control transistor 501 may be an n-type transistor. The light emission control transistor 501 is arranged on a path where a driving current flows. In the example shown in FIG. 5, the light emission control transistor 501 is arranged on a path connecting the source of a driving transistor 202 and a power supply line 205. More specifically, one (for example, drain) of two main terminals of the light emission control transistor 501 is connected to the source of the driving transistor 202. The other (for example, source) of two main terminals of the light emission control transistor 501 is connected to the power supply line 205. The gate of the light emission control transistor 501 of a pixel circuit 101a is connected to the light emission control line 503a. The gate of the light emission control transistor 501 of a pixel circuit 101b is connected to the light emission scanning line 503b.

The capacitive element 502 connects the source of the light emission control transistor 501 and the drain of the light emission control transistor 501. The light emission scanning line 503a is arranged for each odd-numbered pixel row. The light emission scanning line 503b is arranged for each even-numbered pixel row.

Figure 6:
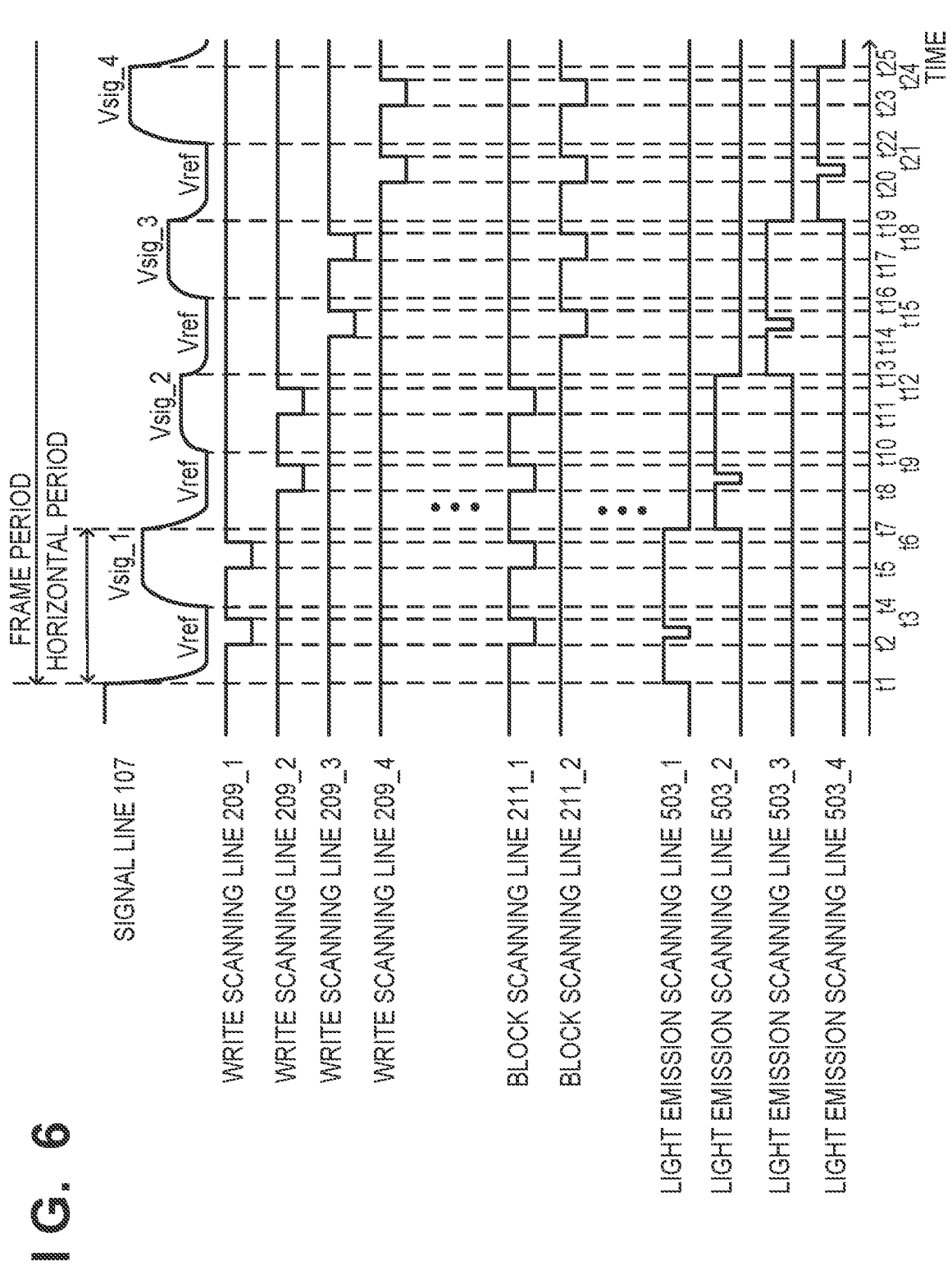
FIG. 6 is a timing chart for explaining an example of the operation of the light emitting device according to the second embodiment.

With reference to FIG. 6, an example of the operation of the light emitting device 100 according to the second embodiment will be described. This operation can be executed when a control circuit 105 controls a vertical scanning circuit 103 to change the potential of a scanning line 106 and controls a signal output circuit 104 to change the potential of a signal line 107. The timing chart of FIG. 6 shows changes of potentials of light emission scanning lines 503_1 to 503_4, in addition to the timing chart of FIG. 3. The light emission scanning line 503_i (i is an integer of 1 or more) is arranged for the ith pixel row from the signal output circuit 104. In the following description, the operation for a specific pixel column included in a pixel array portion 102 will be described. A similar operation is performed for other pixel columns included in the pixel array portion 102.

At the time immediately before time t1, a high-level signal is supplied to each of write scanning lines 209 and block scanning lines 211. Therefore, a write transistor 203 included in each pixel circuit 101 and a block transistor 210 included in each pixel block 108 are OFF. At the time immediately before time t1, a low-level signal is supplied to each of the light emission scanning lines 503. Therefore, the light emission control transistor 501 included in each pixel circuit 101 is ON.

At time t1, the signal output circuit 104 switches the value of the pixel signal supplied to the signal line 107 to a reference potential Vref. The reference potential Vref may have a value independent of a luminance signal. The potential of the signal line 107 is settled at the reference potential Vref in accordance with a time constant corresponding to the load of the signal line 107. In addition, at time t1, the vertical scanning circuit 103 switches the potential of the light emission scanning line 503_1 from low level to high level. As a result, the light emission control transistor 501 of a pixel circuit 101_1 is turned off.

At time t2, the vertical scanning circuit 103 switches the potential of the write scanning line 209_1 and the potential of the block scanning line 211_1 from high level to low level. As a result, the write transistor 203 of the pixel circuit 101_1 and the block transistor 210 included in the pixel block 108_1 are turned on. With this, the potential of the gate of the driving transistor 202 of the pixel circuit 101_1 is set to the reference potential Vref. However, since the light emission control transistor 501 of the pixel circuit 101_1 is OFF, the driving current does not flow.

During the period from time t3 to time t4, the vertical scanning circuit 103 temporarily turns on the light emission control transistor 501 of the pixel circuit 101_1. With this, the source of the driving transistor 202 of the pixel circuit 101_1 is connected to the power supply line 205, and the driving current flows. When the light emission control transistor 501 is turned off, the potential of the source of the driving transistor 202 drops as time elapses. This drop ends when the gate-source voltage of the driving transistor 202 reaches about the threshold voltage of the driving transistor 202. Thus, the threshold voltage of the driving transistor 202 is held in a capacitive element 204.

When the control circuit 105 performs operations from time t4 to time t7, which are similar to those performed from time t1 to time t4 in FIG. 3, a signal potential Vsig_1 is written in the capacitive element 204 of the pixel circuit 101_1. In the period from time t4 to time t7, the light emission control transistor 501 of the pixel circuit 101_1 is kept OFF. Therefore, the light emitting element 201 of the pixel circuit 101_1 does not emit light.

At time t7, the signal output circuit 104 switches the value of the pixel signal supplied to the signal line 107 to the reference potential Vref. The potential of the signal line 107 is settled at the signal potential Vref in accordance with a time constant corresponding to the load of the signal line 107. Further, at time t7, the vertical scanning circuit 103 switches the potential of the light emission scanning line 503_1 from high level to low level. As a result, the light emission control transistor 501 of the pixel circuit 101_1 is turned on. Thus, the light emitting element 201 of the pixel circuit 101_1 emits light with the luminance corresponding to the signal potential Vsig_1. Further, at time t7, the vertical scanning circuit 103 switches the potential of the light emission scanning line 503_2 from low level to high level. As a result, the light emission control transistor 501 of a pixel circuit 101_2 is turned off.

At time t8, the vertical scanning circuit 103 switches the potential of the write scanning line 209_2 and the potential of the block scanning line 211_1 from high level to low level. As a result, the write transistor 203 of the pixel circuit 101_2 and the block transistor 210 included in the pixel block 108_1 are turned on. With this, the potential of the gate of the driving transistor 202 of the pixel circuit 101_2 is set to the reference potential Vref. However, since the light emission control transistor 501 of the pixel circuit 101_2 is OFF, the driving current does not flow.

During the period from time t8 to time t9, the vertical scanning circuit 103 temporarily turns on the light emission control transistor 501 of the pixel circuit 101_2. With this, the source of the driving transistor 202 of the pixel circuit 101_2 is connected to the power supply line 205, and the driving current flows. When the light emission control transistor 501 is turned off, the potential of the source of the driving transistor 202 drops as time elapses. This drop ends when the gate-source voltage of the driving transistor 202 reaches about the threshold voltage of the driving transistor 202. Thus, the threshold voltage of the driving transistor 202 is held in the capacitive element 204.

When the control circuit 105 performs operations from time t10 to time t13, which are similar to those performed from time t4 to time t7 in FIG. 3, a signal potential Vsig_2 is written in the capacitive element 204 of the pixel circuit 101_2. In the period from time t10 to time t13, the light emission control transistor 501 of the pixel circuit 101_2 is kept OFF. Therefore, the light emitting element 201 of the pixel circuit 101_2 does not emit light.

When the control circuit 105 performs operations, which are similar to those performed from time t1 to time t7, for the block scanning line 211_2 from time t13 to time t19, a signal potential Vsig_3 is written in the capacitive element 204 of the pixel circuit 101_3. When the control circuit 105 performs operations, which are similar to those performed from time t10 to time t16, for the block scanning line 211_2 from time t19 to time t25, a signal potential Vsig_4 is written in the capacitive element 204 of the pixel circuit 101_4. Similarly, signal potentials are written in the capacitive elements 204 of the pixel circuits 101 in the fifth pixel row to the last pixel row. When the processing ends for the last pixel row, one frame period ends.

According to the operation shown in FIG. 6, the driving current flowing to the light emitting element 201 of the pixel circuit 101_1 from time t7 is set to a value based on the signal potential Vsig_1 and the capacitance ratio between the capacitive element 204 and the capacitive element 502 but with reduced dependency on the threshold voltage of the driving transistor 202. As a result, the variation of luminance of the light emitting element 201 caused by the variation of the threshold voltage among the driving transistors 202 of the plurality of pixel circuits 101 is reduced. Hence, the quality of image displayed by the light emitting device 100 further improves.

Also in the second embodiment, as in the first embodiment, the load capacitance of the signal line 107 decreases. Also in the second embodiment, as in the modification described with reference to FIG. 4 in the first embodiment, during the period when the write transistors 203 of the pixel circuits 101 in one pixel block 108 are scanned, the block transistor 210 in this pixel block 108 may be kept ON.

Third Embodiment

Figure 7:
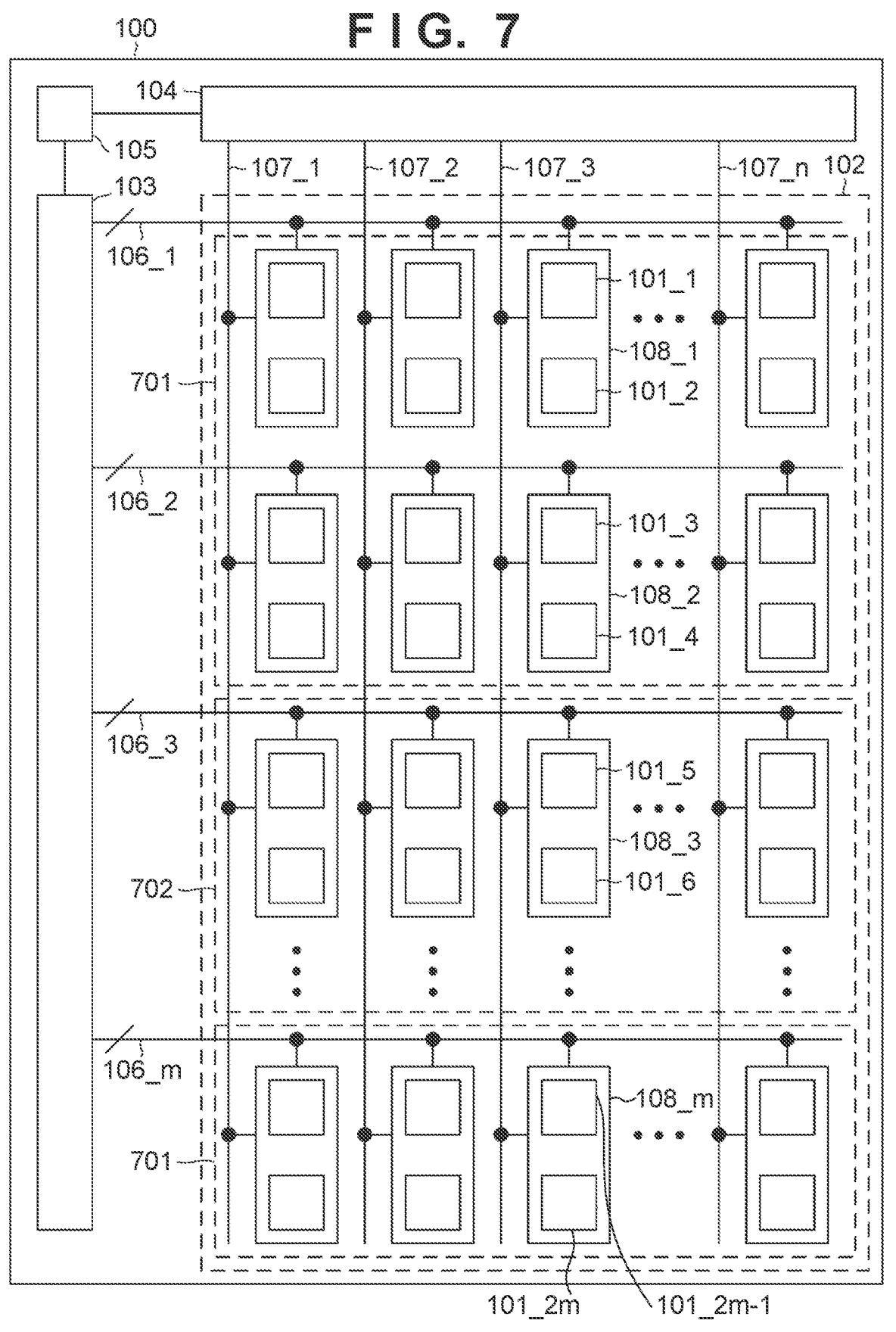
Figure 8:
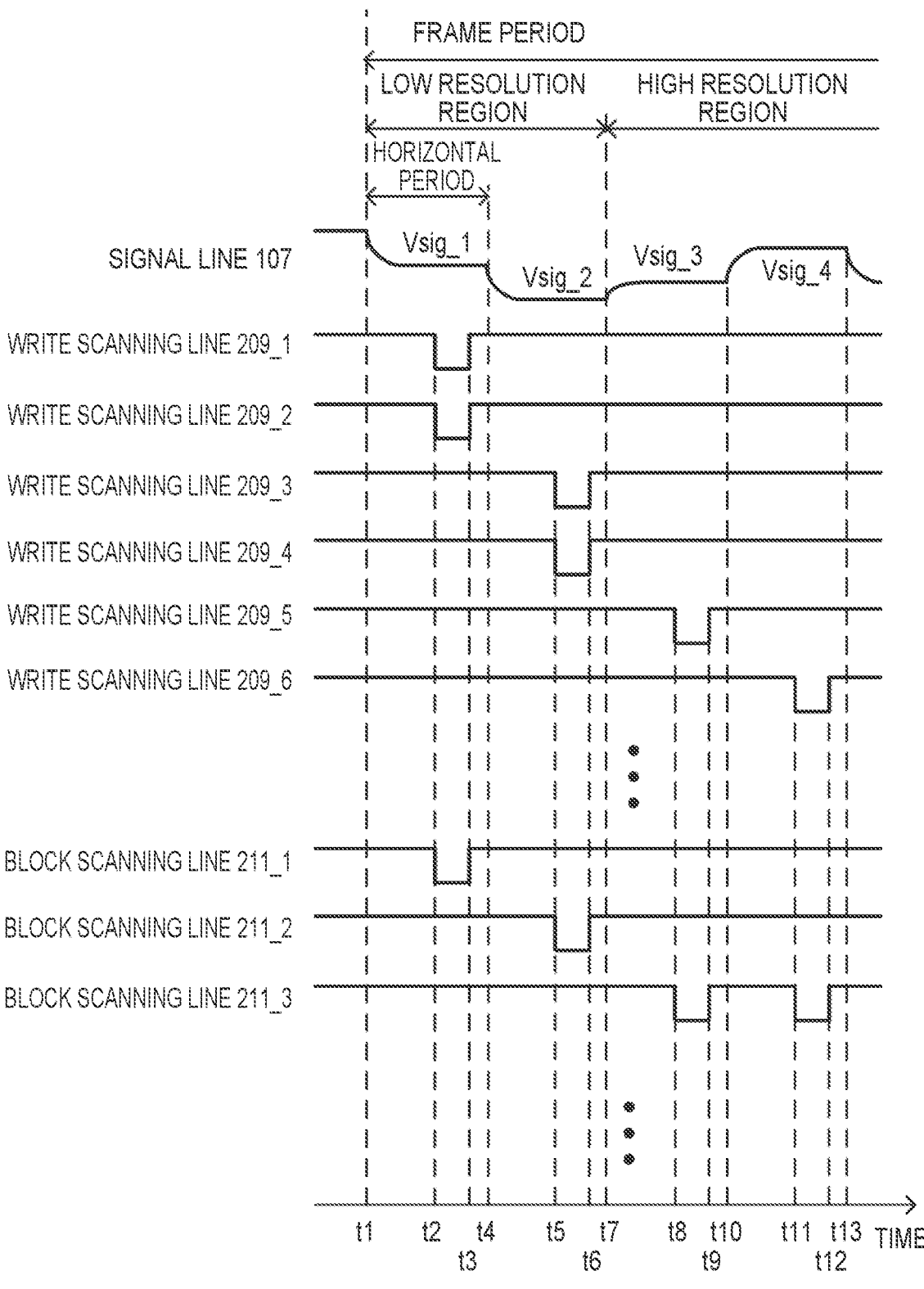
FIG. 8 is a timing chart for explaining an example of the operation of the light emitting device according to the third embodiment.

With reference to FIGS. 7 and 8, an example of the arrangement of a light emitting device 100 according to the third embodiment will be described. The light emitting device 100 according to the third embodiment is different from the light emitting device 100 according to the first embodiment in that a pixel array portion 102 is divided into a low resolution region 701 and a high resolution region 702 and the driving method changes between these regions. The rest may be the same as in the first embodiment. The difference between the first embodiment and the third embodiment may be applied to the second embodiment.

With reference to FIG. 7, an example of the arrangement of the light emitting device 100 according to the third embodiment will be described. The hardware arrangement of the light emitting device 100 according to the third embodiment is the same as that of the light emitting device 100 according to the first embodiment, but the operation of a vertical scanning circuit 103 changes. The light emission luminance is controlled for each pixel circuit 101 in the high resolution region 702, and the light emission luminance is controlled for each pixel block 108 in the low resolution region 701. More specifically, to display one image, one pixel circuit 101 emits light in accordance with one pixel signal in the high resolution region 702, and two pixel circuits 101 included in one pixel block 108 emit light in accordance with one pixel signal in the low resolution region 701. As a result, the image is displayed with higher resolution in the high resolution region 702 than in the low resolution region 701.

In the example shown in FIG. 7, the low resolution region 701 is divided into two portions so as to sandwich the high resolution region 702. The layout of the low resolution region 701 and the high resolution region 702 is not limited to the example shown in FIG. 7. The high resolution region 702 may be divided into two or more portions, or the low resolution region 701 may include only one portion. Further, the number of the pixel blocks 108 included in each of the low resolution region 701 and the high resolution region 702 is not limited to the example shown in FIG. 7. In the example shown in FIG. 7, the pixel array portion 102 is divided in the column direction, and the border between the low resolution region 701 and the high resolution region 702 extends in the row direction. Alternatively or additionally, the pixel array portion 102 may be divided in the row direction and the border between the low resolution region 701 and the high resolution region 702 may extend in the column direction. In this case, separate scanning lines 106 may be arranged respectively for the low resolution region 701 and the high resolution region 702.

With reference to FIG. 8, an example of the operation of the light emitting device 100 will be described. The timing chart of FIG. 8 shows changes of potentials of a signal line 107, write scanning lines 209_1 to 209_6, and block scanning lines 211_1 to 211_3. The write scanning lines 209_1 to 209_4 supply scanning signals to the pixel circuits 101 included in the low resolution region 701. The write scanning lines 209_5 and 209_6 supply scanning signals to the pixel circuits 101 included in the high resolution region 702. The block scanning lines 211_1 and 211_2 supply scanning signals to the pixel blocks 108 included in the low resolution region 701. The block scanning line 211_3 supplies scanning signals to the pixel blocks 108 included in the high resolution region 702. In the following description, the operation for a specific pixel column included in the pixel array portion 102 will be described. A similar operation is performed for other pixel columns included in the pixel array portion 102.

At the time immediately before time t1, a high-level signal is supplied to each of the write scanning lines 209 and the block scanning lines 211. Therefore, a write transistor 203 included in each pixel circuit 101 and a block transistor 210 included in each pixel blocks 108 are OFF.

Since the first pixel row is included in the low resolution region 701, the vertical scanning circuit 103 performs an operation for scanning the low resolution region 701 from time t1. In the operation for scanning the low resolution region 701, light emission is controlled for each pixel block 108. The operation for scanning the low resolution region 701 will be specifically described below.

At time t1, a signal output circuit 104 switches the value of the pixel signal supplied to the signal line 107 to a signal potential Vsig_1. The signal potential Vsig_1 has a value corresponding to the luminance of light to be emitted by a light emitting element 201 of a pixel circuit 101_1 and the light emitting element 201 of a pixel circuit 101_2 included in the second pixel row. The potential of the signal line 107 is settled at the signal potential Vsig_1 in accordance with a time constant corresponding to the load of the signal line 107.

At time t2, the vertical scanning circuit 103 switches the potential of the write scanning line 209_1, the potential of the write scanning line 209_2, and the potential of the block scanning line 211_1 from high level to low level. As a result, the write transistor 203 of the pixel circuit 101_1, the write transistor 203 of the pixel circuit 101_2 included in the second pixel row, and the block transistor 210 included in the pixel block 108_1 are turned on. With this, the signal potential Vsig_1 is written in a capacitive element 204 of the pixel circuit 101_1 and the capacitive element 204 of the pixel circuit 101_2, and the light emitting element 201 of the pixel circuit 101_1 and the light emitting element 201 of the pixel circuit 101_2 emit light with the luminance corresponding to the signal potential Vsig_1.

At time t3, the vertical scanning circuit 103 switches the potential of the write scanning line 209_1, the potential of the write scanning line 209_2, and the potential of the block scanning line 211_1 from low level to high level. As a result, the write transistor 203 of the pixel circuit 101_1, the write transistor 203 of the pixel circuit 101_2, and the block transistor 210 included in the pixel block 108_1 are turned off. After this, the capacitive element 204 of the pixel circuit 101_1 and the capacitive element 204 of the pixel circuit 101_2 continue to hold the signal potential Vsig_1.

At time t4, the signal output circuit 104 switches the value of the pixel signal supplied to the signal line 107 to a signal potential Vsig_2. The signal potential Vsig_2 has a value corresponding to the luminance of light to be emitted by the light emitting element 201 of a pixel circuit 101_3 included in the third pixel row and the light emitting element 201 of a pixel circuit 101_4 included in the fourth pixel row. The potential of the signal line 107 is settled at the signal potential Vsig_2 in accordance with the time constant corresponding to the load of the signal line 107.

The operations performed from time t5 to time t6 are similar to the operations performed from time t2 to time t3. With the operations performed from time t5 to time t6, the light emitting element 201 of the pixel circuit 101_3 and the light emitting element 201 of the pixel circuit 101_4 emit light with the luminance corresponding to the signal potential Vsig_2.

Since the third pixel row is included in the high resolution region 702, the vertical scanning circuit 103 performs an operation for scanning the high resolution region 702 from time t7. With the operation for scanning the high resolution region 702, the light emission of each of two pixel circuits 101 included in each pixel block 108 is individually controlled, as in the first embodiment. Subsequently, the vertical scanning circuit 103 executes the corresponding scanning method until the last pixel row in accordance with whether the pixel block 108 is in the low resolution region 701 or the high resolution region 702. When the processing for the last pixel row ends, one frame period ends.

As has been described above, in the third embodiment, for the pixel block 108 included in the low resolution region 701, the vertical scanning circuit 103 overlaps the period during which the write transistor 203 of a pixel circuit 101*a* is ON, the period during which the write transistor 203 of a pixel circuit 101*b* is ON, and the period during which the block transistor 210 is ON, thereby writing the signal potential Vsig in each of the control terminal of a driving transistor 202 of the pixel circuit 101*a* and the control terminal of the driving transistor 202 of the pixel circuit 101*b*. Also in the third embodiment, as in the first embodiment, the load capacitance of the signal line 107 is decreased.

A control circuit 105 may dynamically change the layout of the low resolution region 701 and the high resolution region 702 (to be referred to as the resolution layout hereinafter) in the pixel array portion 102. The control circuit 105 may set the resolution layout in accordance with the preset setting, may set the resolution layout in accordance with a user instruction, or may set the resolution layout in accordance with the characteristics of the image to be displayed. The control circuit 105 may change the resolution layout for each frame. For example, in a given frame, the pixel blocks 108_1 to 108_*j* and the pixel blocks 108_*k*+1 to 108_*m* are included in the low resolution region 701, and the pixel blocks 108_*j*+1 to 108_*k* are included in the high resolution region 702. In another frame, the pixel blocks 108_1 to 108_*j*+2 and the pixel blocks 108_*k*+3 to 108_*m* are included in the low resolution region 701, and the pixel blocks 108_*j*+3 to 108_*k*+2 are included in the high resolution region 702. In some of the pixel blocks 108, the block transistor 210 may be omitted and the signal line 107 and the write transistor 203 may be directly connected. For example, the block transistor 210 included in the low resolution region 701 may be omitted and the block transistor 210 may be included in the high resolution region 702. Alternatively, the block transistor 210 included in the high resolution region 702 may be omitted and the block transistor 210 may be included in the low resolution region 701.

The period during which the block transistor 210 is ON in the low resolution region 701 is not limited to the example shown in FIG. 8. For example, the block transistor 210 of the pixel block 108_1 may be kept ON during the period overlapping time t2 to time t3 (for example, the period from time t1 to time t4). Alternatively, in the low resolution region 701, the write transistor 203 may be constantly kept ON, and the pixel circuit 101 to write the signal potential Vsig may be selected by switching ON/OFF of the block transistor 210. The period during which the block transistor 210 is ON in the high resolution region 702 is not limited to the example shown in FIG. 8. For example, the block transistor 210 may be kept ON as in the modification of the first embodiment.

Fourth Embodiment

Figure 9:
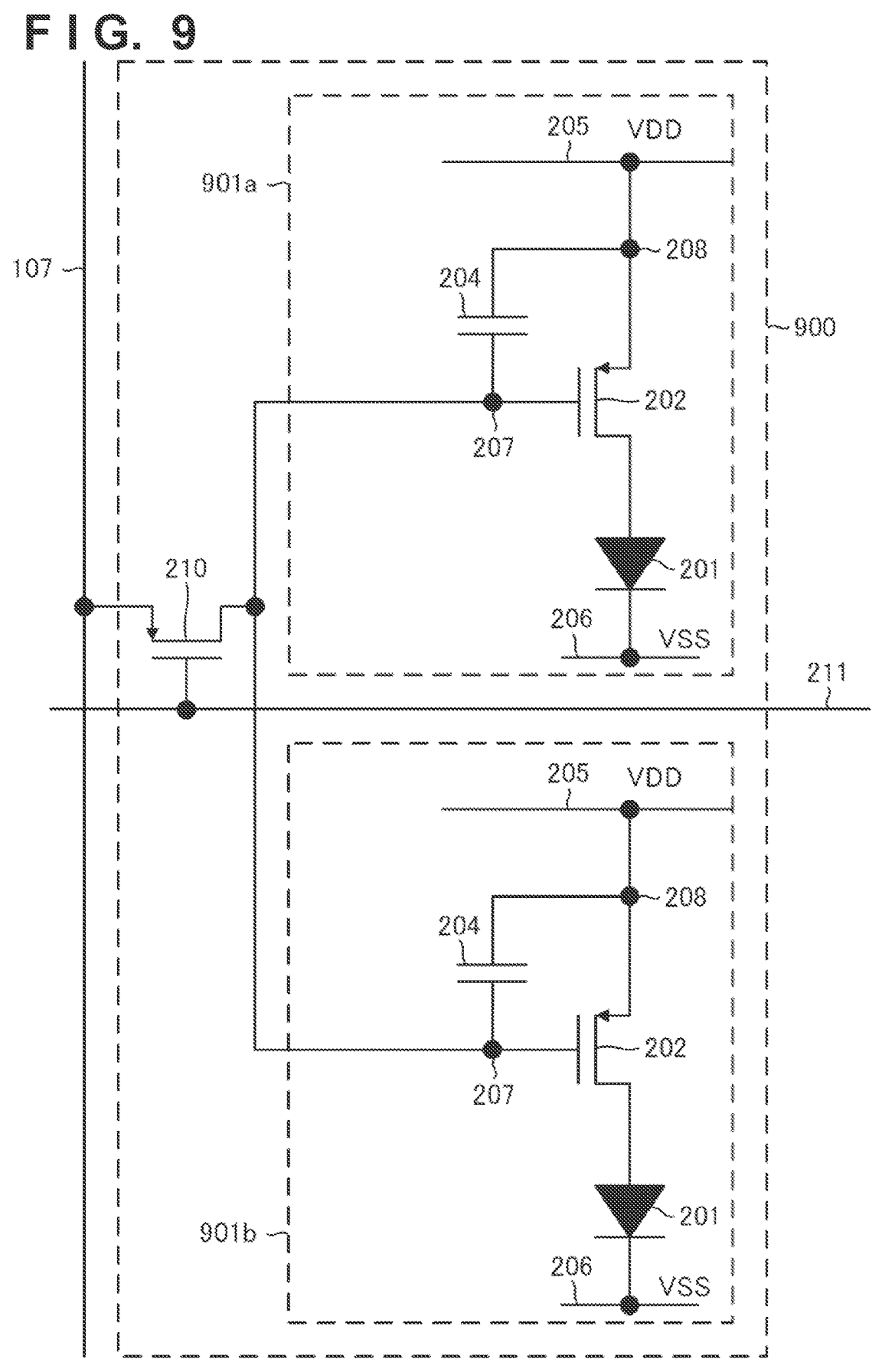

With reference to FIGS. 9 and 10, an example of the arrangement of a light emitting device 100 according to the fourth embodiment will be described. The light emitting device 100 according to the fourth embodiment is different from the light emitting device 100 according to the third embodiment in that a pixel block 900 shown in FIG. 9 is included in a low resolution region 701 instead of a pixel block 108. The rest may be the same as in the third embodiment. The modification described in the third embodiment is also applicable to the fourth embodiment.

With reference to FIG. 9, an example of the arrangement of the pixel block 900 will be described. The pixel block 900 is formed by two pixel circuits 901a and 901b adjacent to each other in the column direction and a block transistor 210. The pixel circuit 901a and the pixel circuit 901b may have the same arrangement or different arrangements. The pixel circuits 901a and 901b will be collectively referred to as pixel circuits 901. The following description of the pixel circuit 901 applies to each of two pixel circuits 901a and 901b.

The pixel circuit 901 is different from a pixel circuit 101 in that a write transistor 203 is not included. Accordingly, the control terminal of a driving transistor 202 is connected to the block transistor 210 without intervening another transistor. That is, the control terminal of the driving transistor 202 of the pixel circuit 901a, the control terminal of the driving transistor 202 of the pixel circuit 901b, and one (for example, drain) of main terminals of the block transistor 210 are connected to the same node. The light emitting device 100 does not include a write scanning line for the pixel circuits 901a and 901b.

With reference to FIG. 10, an example of the operation of the light emitting device 100 will be described. The timing chart of FIG. 10 shows changes of potentials of a signal line 107, write scanning lines 209_1 and 209_2, and block scanning lines 211_1 to 211_3. The write scanning lines 209_1 and 209_2 supply scanning signals to the pixel circuits 101 included in a high resolution region 702. The block scanning lines 211_1 and 211_2 supply scanning signals to the pixel blocks 108 included in the low resolution region 701. The block scanning line 211_3 supplies scanning signals to the pixel blocks 108 included in the high resolution region 702. In the following description, the operation for a specific pixel column included in a pixel array portion 102 will be described. A similar operation is performed for other pixel columns included in the pixel array portion 102.

At the time immediately before time t1, a high-level signal is supplied to each of the write scanning lines 209 and the block scanning lines 211. Therefore, the write transistors 203 included in each pixel circuit 101 and the block transistors 210 included in each pixel block 108 are OFF.

Since the first pixel row is included in the low resolution region 701, a vertical scanning circuit 103 performs an operation for scanning the low resolution region 701 from time t1. In the operation for scanning the low resolution region 701, light emission is controlled for each pixel block 108. The operation for scanning the low resolution region 701 will be specifically described below.

At time t1, a signal output circuit 104 switches the value of the pixel signal supplied to the signal line 107 to a signal potential Vsig_1. The signal potential Vsig_1 has a value corresponding to the luminance of light to be emitted by a light emitting element 201 of a pixel circuit 101_1 and the light emitting element 201 of a pixel circuit 101_2 included in the second pixel row. The potential of the signal line 107 is settled at the signal potential Vsig_1 in accordance with a time constant corresponding to the load of the signal line 107.

At time t2, the vertical scanning circuit 103 switches the potential of the block scanning line 211_1 from high level to low level. As a result, the block transistor 210 included in the pixel block 108_1 is turned on. With this, the signal potential Vsig_1 is written in a capacitive element 204 of the pixel circuit 101_1 and the capacitive element 204 of the pixel circuit 101_2, and the light emitting element 201 of the pixel circuit 101_1 and the light emitting element 201 of the pixel circuit 101_2 emit light with the luminance corresponding to the signal potential Vsig_1.

At time t3, the vertical scanning circuit 103 switches the potential of the block scanning line 211_1 from low level to high level. As a result, the block transistor 210 included in the pixel block 108_1 is turned off. After this, the capacitive element 204 of the pixel circuit 101_1 and the capacitive element 204 of the pixel circuit 101_2 continue to hold the signal potential Vsig_1.

At time t4, the signal output circuit 104 switches the value of the pixel signal supplied to the signal line 107 to a signal potential Vsig_2. The signal potential Vsig_2 has a value corresponding to the luminance of light to be emitted by the light emitting element 201 of a pixel circuit 101_3 included in the third pixel row and the light emitting element 201 of a pixel circuit 101_4 included in the fourth pixel row. The potential of the signal line 107 is settled at the signal potential Vsig_2 in accordance with the time constant corresponding to the load of the signal line 107.

The operations performed from time t5 to time t6 are similar to the operations performed from time t2 to time t3. With the operations performed from time t5 to time t6, the light emitting element 201 of the pixel circuit 101_3 and the light emitting element 201 of the pixel circuit 101_4 emit light with the luminance corresponding to the signal potential Vsig_2.

Since the third pixel row is included in the high resolution region 702, the vertical scanning circuit 103 performs an operation for scanning the high resolution region 702 from time t7. With the operation for scanning the high resolution region 702, the light emission of each of two pixel circuits 101 included in each pixel block 108 is individually controlled, as in the first embodiment. Subsequently, the vertical scanning circuit 103 executes the corresponding scanning method until the last pixel row in accordance with whether the pixel block 108 is in the low resolution region 701 or the high resolution region 702. When the processing for the last pixel row ends, one frame period ends.

As has been described above, in the fourth embodiment, for the pixel block 108 included in the low resolution region 701, the vertical scanning circuit 103 turns on the block transistor 210 to write the signal potential Vsig in each of the control terminal of the driving transistor 202 of the pixel circuit 101a and the control terminal of the driving transistor 202 of the pixel circuit 101b. Also in the fourth embodiment, as in the first embodiment, the load capacitance of the signal line 107 is decreased.

The control circuit 105 may dynamically change the resolution layout. More specifically, the control circuit 105 may set whether to include the portion of the pixel array portion 102 including the pixel block 900 in the low resolution region 701 or the high resolution region 702.

Other Embodiments

Figure 11:
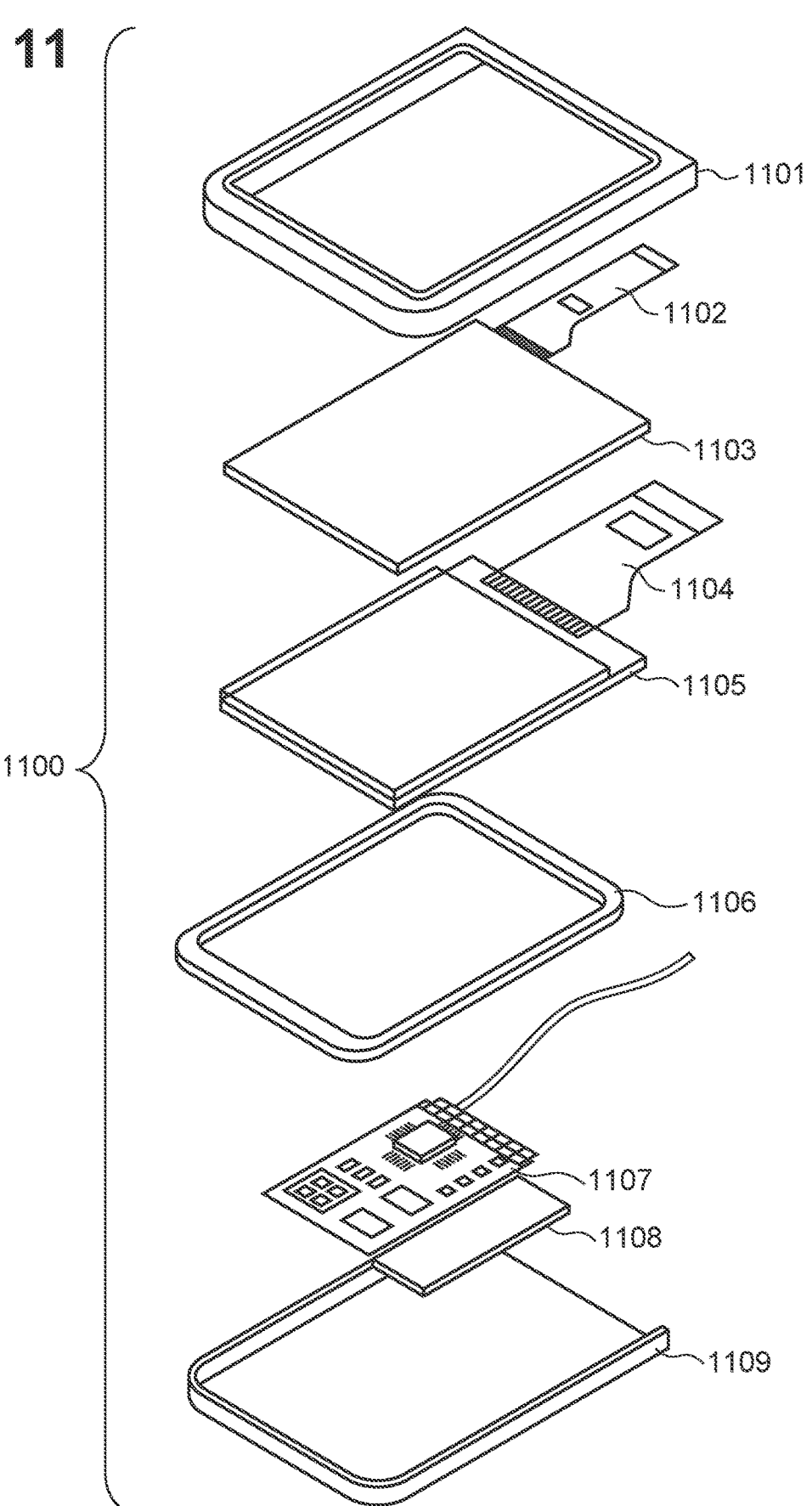
FIG. 11 is a view showing an example of a display device using the light emitting device according to the embodiment.

FIG. 11 is a schematic view showing an example of a display device according to this embodiment. A display device 1100 may include, between an upper cover 1101 and a lower cover 1109, a touch panel 1103, a display panel 1105, a frame 1106, a circuit board 1107, and a battery 1108. The touch panel 1103 and the display panel 1105 are connected to flexible printed circuit FPCs 1102 and 1104, respectively. Transistors are printed on the circuit board 1107. The battery 1108 may not be provided if the display device is not a portable apparatus, or may be provided in another position even if the display device is a portable apparatus.

The display device according to this embodiment may include color filters of red, green, and blue. The color filters of red, green, and blue may be arranged in a delta array.

The display device according to this embodiment may also be used for a display unit of a portable terminal. At this time, the display unit may have both a display function and an operation function. Examples of the portable terminal are a portable phone such as a smartphone, a tablet, and a head mounted display.

The display device according to this embodiment may be used for a display unit of an image capturing device including an optical unit having a plurality of lenses, and an image sensor for receiving light having passed through the optical unit. The image capturing device may include a display unit for displaying information acquired by the image sensor. In addition, the display unit may be either a display unit exposed outside the image capturing device, or a display unit arranged in the finder. The image capturing device may be a digital camera or a digital video camera.

FIG. 12A is a schematic view showing an example of an image capturing device according to this embodiment. An image capturing device 1200 may include a viewfinder 1201, a rear display 1202, an operation unit 1203, and a housing 1204. The viewfinder 1201 may include the display device according to this embodiment. In this case, the display device may display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time, so the information is preferably displayed as soon as possible. Therefore, the display device using the organic light emitting element of the present invention is preferably used. This is so because the organic light emitting element has a high response speed. The display device using the organic light emitting element can be used for the apparatuses that require a high display speed more preferably than for the liquid crystal display device.

The image capturing device 1200 includes an optical unit (not shown). This optical unit includes a plurality of lenses, and forms an image on an image sensor that is accommodated in the housing 1204. The focal points of the plurality of lenses can be adjusted by adjusting the relative positions. This operation can also automatically be performed. The image capturing device may be called a photoelectric conversion device. Instead of sequentially capturing an image, the photoelectric conversion device can include, as an image capturing method, a method of detecting the difference from a previous image, a method of extracting an image from an always recorded image, or the like.

FIG. 12B is a schematic view showing an example of an electronic apparatus according to this embodiment. An electronic apparatus 1250 includes a display unit 1251, an operation unit 1252, and a housing 1253. The housing 1253 may accommodate a circuit, a printed board including this circuit, a battery, and a communication unit. The operation unit 1252 may be a button or a touch-panel-type reaction unit. The operation unit may also be a biometric authentication unit that performs unlocking or the like by authenticating a fingerprint. The electronic apparatus including the communication unit can also be regarded as a communication apparatus. The electronic apparatus may further have a camera function by including a lens and an image sensor. An image captured by the camera function is displayed on the display unit. Examples of the electronic apparatus are a smartphone and a laptop computer.

Figure 13A:
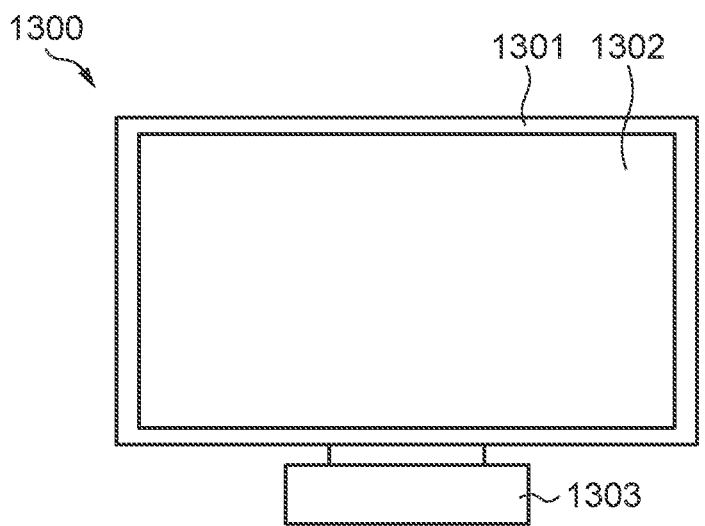
FIGS. 13A and 13B are views each showing an example of a display device using the light emitting device according to the embodiment.
Figure 13B:
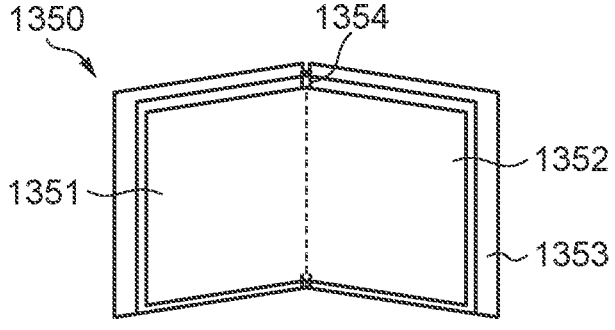

FIGS. 13A and 13B are schematic views showing examples of a display device according to this embodiment. FIG. 13A shows a display device such as a television monitor or a PC monitor. A display device 1300 includes a frame 1301 and a display unit 1302. The light emitting device according to the embodiment may be used in the display unit 1302.

The display device 1300 includes a base 1303 that supports the frame 1301 and the display unit 1302. The base 1303 is not limited to the form shown in FIG. 13A. The lower side of the frame 1301 may also function as the base.

In addition, the frame 1301 and the display unit 1302 may be bent. The radius of curvature may be 5,000 mm (inclusive) to 6,000 mm (inclusive).

FIG. 13B is a schematic view showing another example of the display device according to this embodiment. A display device 1350 shown in FIG. 13B is configured to be foldable, that is, the display device 1350 is a so-called foldable display device. The display device 1350 includes a first display unit 1351, a second display unit 1352, a housing 1353, and a bending point 1354. Each of the first display unit 1351 and the second display unit 1352 may include the light emitting device according to the embodiment. The first display unit 1351 and the second display unit 1352 may also be one seamless display device. The first display unit 1351 and the second display unit 1352 can be divided by the bending point. The first display unit 1351 and the second display unit 1352 may display different images, and may display one image together.

FIG. 14A is a schematic view showing an example of an illumination device according to this embodiment. An illumination device 1400 may include a housing 1401, a light source 1402, a circuit board 1403, an optical film 1404, and a light-diffusing unit 1405. The light source may include the organic light emitting element according to the embodiment. The optical film may be a film that improves the color rendering of the light source. When performing lighting-up or the like, the light-diffusing unit can throw the light of the light source over a broad range by effectively diffusing the light. The optical film and the light-diffusing unit may be provided on the illumination light emission side. The illumination device may also include a cover on the outermost portion, as needed.

The illumination device is, for example, a device for illuminating the interior of the room. The illumination device may emit white light, natural white light, or light of another color from blue to red. The illumination device may include a light control circuit for controlling these light components. The illumination device may include the organic light emitting element according to the present invention and a power supply circuit connected to the organic light emitting element. The power supply circuit is a circuit for converting an AC voltage into a DC voltage. White has a color temperature of 4,200 K, and natural white has a color temperature of 5,000 K. The illumination device may also include a color filter.

In addition, the illumination device according to this embodiment may include a heat radiation unit. The heat radiation unit radiates the internal heat of the device to the outside of the device, and examples are a metal having a high specific heat and liquid silicon.

FIG. 14B is a schematic view of an automobile as an example of a moving body according to this embodiment.

The automobile has a taillight as an example of the lighting appliance. An automobile 1450 has a taillight 1451, and may have a form in which the taillight is turned on when performing a braking operation or the like.

The taillight 1451 may include the organic light emitting element according to the embodiment. The taillight may include a protection member for protecting the organic EL element. The material of the protection member is not limited as long as the material is a transparent material with a strength that is high to some extent, and is preferably polycarbonate or the like. A furandicarboxylic acid derivative, an acrylonitrile derivative, or the like may be mixed in polycarbonate.

The automobile 1450 may include a vehicle body 1453, and a window 1452 attached to the vehicle body 1453. The window may be a transparent display as long as it is not a window for checking the front or rear of the automobile. This transparent display may include the organic light emitting element according to the embodiment. In this case, the constituent materials of the electrodes and the like of the organic light emitting element are formed from transparent members.

The moving body according to this embodiment includes a driving unit such as an engine or a motor and a moving unit such as wheels, a propeller, or tires. For example, the moving body may be an automobile, a ship, an airplane, a drone, a bicycle, a railroad car, or the like. The moving body may include a main body and a lighting appliance provided on the main body. The lighting appliance may emit light for making a notification of the position of the main body. The lighting appliance includes the organic light emitting element according to the embodiment.

An application example of the display device according to each embodiment described above will be described with reference to FIGS. 15A and 15B. The display device can be applied to a system that can be worn as a wearable device such as smartglasses, an HMD, or a smart contact lens. An image capturing display device used in such an application example includes an image capturing device capable of photoelectrically converting visible light and a display device capable of emitting visible light.

Glasses 1500 (smartglasses) according to one application example will be described with reference to FIG. 15A. An image capturing device 1502 such as a CMOS sensor or an SPAD is provided on the surface side of a lens 1501 of the glasses 1500. In addition, the display device of each of the above-described embodiments is provided on the back surface side of the lens 1501.

The glasses 1500 further includes a control device 1503. The control device 1503 functions as a power supply that supplies power to the image capturing device 1502 and the display device according to each embodiment. In addition, the control device 1503 controls the operations of the image capturing device 1502 and the display device. An optical system configured to condense light to the image capturing device 1502 is formed on the lens 1501.

Glasses 1550 (smartglasses) according to one application example will be described with reference to FIG. 15B. The glasses 1550 includes a control device 1552. An image capturing device corresponding to the image capturing device 1502 and a display device are mounted on the control device 1552. An optical system configured to project light emitted from the display device in the control device 1552 is formed in a lens 1551, and an image is projected to the lens 1551. The control device 1552 functions as a power supply that supplies power to the image capturing device and the display device, and controls the operations of the image capturing device and the display device. The control device may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The display device according to the embodiment of the present invention may include an image capturing device including a light receiving element, and a displayed image on the display device may be controlled based on the line-of-sight information of the user from the image capturing device.

More specifically, the display device decides a first display region at which the user is gazing and a second display region other than the first display region based on the line-of-sight information. The first display region and the second display region may be decided by the control device of the display device, or those decided by an external control device may be received. In the display region of the display device, the display resolution of the first display region may be controlled to be higher than the display resolution of the second display region. That is, the resolution of the second display region may be lower than that of the first display region.

In addition, the display region includes a first display region and a second display region different from the first display region, and a region of higher priority is decided from the first display region and the second display region based on line-of-sight information. The first display region and the second display region may be decided by the control device of the display device, or those decided by an external control device may be received. The resolution of the region of higher priority may be controlled to be higher than the resolution of the region other than the region of higher priority. That is, the resolution of the region of relatively low priority may be low.

Note that AI may be used to decide the first display region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the display device, the image capturing device, or an external device. If the external device holds the AI program, it is transmitted to the display device via communication.

When performing display control based on line-of-sight detection, smartglasses further including an image capturing device configured to capture the outside can preferably be applied. The smartglasses can display captured outside information in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-190196, filed Nov. 7, 2023 and Japanese Patent Application No. 2024-131208, filed Aug. 7, 2024, which are hereby incorporated by reference herein in their entirety.

What is claimed is:

1. A light emitting device comprising:
a first pixel circuit and a second pixel circuit;
a signal line configured to supply a pixel signal to the first pixel circuit and the second pixel circuit;
a first transistor connected to the signal line; and
a scanning circuit configured to switch each of the first transistor, each transistor of the first pixel circuit, and each transistor of the second pixel circuit between ON and OFF,
wherein each of the first pixel circuit and the second pixel circuit includes (1) a light emitting element, (2) a second transistor arranged on a path where a current for causing the light emitting element to emit light flows, and (3) a third transistor connected to a control terminal of the second transistor,
wherein the third transistor of each of the first pixel circuit and the second pixel circuit is connected to the signal line via the first transistor, and
wherein the scanning circuit (1) writes the pixel signal in the control terminal of the second transistor of the first pixel circuit by overlapping a period during which the first transistor is ON and a period during which the third transistor of the first pixel circuit is ON, and (2) writes the pixel signal in the control terminal of the second transistor of the second pixel circuit by overlapping a period during which the first transistor is ON and a period during which the third transistor of the second pixel circuit is ON.

2. The device according to claim 1, wherein the first pixel circuit and the second pixel circuit are arranged in an extending direction of the signal line.

3. The device according to claim 1, wherein the scanning circuit (1) keeps the third transistor of the second pixel circuit OFF while both the first transistor and the third transistor of the first pixel circuit are ON, and (2) keeps the third transistor of the first pixel circuit OFF while both the first transistor and the third transistor of the second pixel circuit are ON.

4. The device according to claim 1, wherein the scanning circuit (1) turns off the third transistor of the first pixel circuit while keeping the first transistor ON from a state in which both the first transistor and the third transistor of the first pixel circuit are ON, and (2) turns off the third transistor of the second pixel circuit while keeping the first transistor ON from a state in which both the first transistor and the third transistor of the second pixel circuit are ON.

5. The device according to claim 1, further comprising:
a third pixel circuit and a fourth pixel circuit to which a pixel signal is supplied from the signal line; and a fourth transistor connected to the signal line,
wherein each of the third pixel circuit and the fourth pixel circuit includes (1) second light emitting element, (2) a fifth transistor arranged on a path where a current for causing the second light emitting element to emit light flows, and (3) a sixth transistor connected to a control terminal of the fifth transistor,
wherein the sixth transistor of each of the third pixel circuit and the fourth pixel circuit is connected to the signal line via the fourth transistor, and
wherein the scanning circuit writes the pixel signal in each of the control terminal of the fifth transistor of the third pixel circuit and the control terminal of the fifth transistor of the fourth pixel circuit by overlapping a period during which the fourth transistor is ON, a period during which the sixth transistor of the third pixel circuit is ON, and a period during which the sixth transistor of the fourth pixel circuit is ON.

6. The device according to claim 1, further comprising:
a fifth pixel circuit and a sixth pixel circuit to which a pixel signal is supplied from the signal line; and
a seventh transistor connected to the signal line,
wherein each of the fifth pixel circuit and the sixth pixel circuit includes (1) a third light emitting element, and (2) an eighth transistor arranged on a path where a current for causing the third light emitting element to emit light flows,
wherein a control terminal of the eighth transistor of each of the fifth pixel circuit and the sixth pixel circuit is connected to the seventh transistor without intervening another transistor, and
wherein the scanning circuit writes the pixel signal in each of the control terminal of the eighth transistor of the fifth pixel circuit and the control terminal of the eighth transistor of the sixth pixel circuit by turning on the seventh transistor.

7. The device according to claim 1, wherein a capacitance of the first transistor is smaller than a capacitance of the third transistor of each of the first pixel circuit and the second pixel circuit.

8. The device according to claim 1, wherein a thickness of a gate insulating film of the first transistor is larger than a thickness of a gate insulating film of the third transistor of each of the first pixel circuit and the second pixel circuit.

9. The device according to claim 1, wherein an area of a substrate surface occupied by the first transistor is smaller than an area of a substrate surface occupied by the third transistor of each of the first pixel circuit and the second pixel circuit.

10. A photoelectric conversion device comprising:
an optical unit including a plurality of lenses;
an image sensor configured to receive light having passed through the optical unit; and
a display unit configured to display an image captured by the image sensor,
wherein the display unit includes a light emitting device according to claim 1.

11. An electronic apparatus comprising:
a display unit including a light emitting device according to claim 1;
a housing provided with the display unit; and
a communication unit provided in the housing and configured to perform external communication.

* * * * *